(12) United States Patent  
Bailey et al.

(10) Patent No.: US 8,533,967 B2  
(45) Date of Patent: Sep. 17, 2013

(54) COORDINATE MEASUREMENT MACHINES WITH REMOVABLE ACCESSORIES

(75) Inventors: Brent Bailey, Winter Springs, FL (US); Marc M. Barber, Deltona, FL (US); Clark H. Briggs, Deland, FL (US); Paul C. Atwell, Lake Mary, FL (US)

(73) Assignee: Faro Technologies, Inc., Lake Mary, FL (US)

( * ) Notice: Subject to any disclaimer, the term of this patent is extended or adjusted under 35 U.S.C. 154(b) by 119 days.

(21) Appl. No.: 13/006,507

(22) Filed: Jan. 14, 2011

(65) Prior Publication Data

US 2011/0173827 A1   Jul. 21, 2011

Related U.S. Application Data

(60) Provisional application No. 61/296,555, filed on Jan. 20, 2010, provisional application No. 61/355,279, filed on Jun. 16, 2010, provisional application No. 61/351,347, filed on Jun. 4, 2010.

(51) Int. Cl.  
*G01B 5/008* (2006.01)  
*G01B 7/008* (2006.01)

(52) U.S. Cl.  
USPC .......................................................... 33/503

(58) Field of Classification Search  
USPC .......................................................... 33/503  
See application file for complete search history.

(56) References Cited

U.S. PATENT DOCUMENTS

| | | | |
|---|---|---|---|
| 1,535,312 | A | 4/1925 | Hosking |
| 1,918,813 | A | 2/1932 | Kinzy |
| 2,316,573 | A | 4/1943 | Egy |
| 2,333,243 | A | 11/1943 | Glab |
| 2,702,683 | A | 2/1955 | Green et al. |
| 2,748,926 | A | 6/1956 | Leahy |
| 2,924,495 | A | 2/1960 | Haines |
| 2,966,257 | A | 12/1960 | Littlejohn |
| 2,983,367 | A | 5/1961 | Paramater et al. |
| 3,066,790 | A | 12/1962 | Armbruster |
| 3,458,167 | A | 7/1969 | Cooley, Jr. |
| 4,138,045 | A | 2/1979 | Baker |

(Continued)

FOREIGN PATENT DOCUMENTS

| | | |
|---|---|---|
| CN | 2236119 | 9/1996 |
| CN | 2508896 | 9/2002 |

(Continued)

OTHER PUBLICATIONS

International Preliminary Report on Patentability for International Application Serial No. PCT/US2011/021246 International filing date Jan. 14, 2011. Date of Issuance Jul. 24, 2012.

(Continued)

*Primary Examiner* — Christopher Fulton  
(74) *Attorney, Agent, or Firm* — Cantor Colburn LLP

(57) ABSTRACT

A portable articulated arm coordinate measuring machine is provided. The coordinate measuring machine includes a base with an arm portion. A probe end is coupled to an end of the arm portion distal from the base. The probe end has a fastener and a first connector. A device is removably coupled to the probe end by the fastener, the accessory having a second connector arranged to engage the first connector when the fastener couples the device to the probe end.

54 Claims, 21 Drawing Sheets

(56) References Cited

U.S. PATENT DOCUMENTS

| | | |
|---|---|---|
| 4,340,008 A | 7/1982 | Mendelson |
| 4,379,461 A | 4/1983 | Nilsson et al. |
| 4,424,899 A | 1/1984 | Rosenberg |
| 4,430,796 A | 2/1984 | Nakagawa |
| 4,457,625 A | 7/1984 | Greenleaf et al. |
| 4,506,448 A | 3/1985 | Topping et al. |
| 4,537,233 A | 8/1985 | Vroonland et al. |
| 4,606,696 A | 8/1986 | Slocum |
| 4,659,280 A | 4/1987 | Akeel |
| 4,663,852 A | 5/1987 | Guarini |
| 4,664,588 A | 5/1987 | Newell et al. |
| 4,676,002 A | 6/1987 | Slocum |
| 4,714,339 A | 12/1987 | Lau et al. |
| 4,751,950 A | 6/1988 | Bock |
| 4,790,651 A | 12/1988 | Brown et al. |
| 4,816,822 A | 3/1989 | Vache et al. |
| 4,882,806 A | 11/1989 | Davis |
| 4,954,952 A | 9/1990 | Ubhayakar et al. |
| 4,982,841 A | 1/1991 | Goedecke |
| 4,996,909 A | 3/1991 | Vache et al. |
| 5,025,966 A | 6/1991 | Potter |
| 5,027,951 A | 7/1991 | Johnson |
| 5,189,797 A | 3/1993 | Granger |
| 5,205,111 A | 4/1993 | Johnson |
| 5,211,476 A | 5/1993 | Coudroy |
| 5,213,240 A | 5/1993 | Dietz et al. |
| 5,219,423 A | 6/1993 | Kamaya |
| 5,239,855 A | 8/1993 | Schleifer et al. |
| 5,289,264 A | 2/1994 | Steinbichler |
| 5,319,445 A | 6/1994 | Fitts |
| 5,332,315 A | 7/1994 | Baker et al. |
| 5,372,250 A | 12/1994 | Johnson |
| 5,402,582 A | 4/1995 | Raab |
| 5,412,880 A | 5/1995 | Raab |
| 5,430,384 A | 7/1995 | Hocker |
| 5,455,670 A | 10/1995 | Payne et al. |
| 5,455,993 A | 10/1995 | Link et al. |
| 5,510,977 A | 4/1996 | Raab |
| 5,528,505 A | 6/1996 | Granger et al. |
| 5,535,524 A | 7/1996 | Carrier et al. |
| 5,611,147 A | 3/1997 | Raab |
| 5,623,416 A | 4/1997 | Hocker, III |
| 5,682,508 A | 10/1997 | Hocker, III |
| 5,724,264 A | 3/1998 | Rosenberg et al. |
| 5,752,112 A | 5/1998 | Paddock et al. |
| 5,754,449 A | 5/1998 | Hoshal et al. |
| 5,768,792 A | 6/1998 | Raab |
| 5,829,148 A | 11/1998 | Eaton |
| 5,832,416 A | 11/1998 | Anderson |
| 5,887,122 A | 3/1999 | Terawaki et al. |
| 5,926,782 A | 7/1999 | Raab |
| 5,956,857 A | 9/1999 | Raab |
| 5,973,788 A | 10/1999 | Pettersen et al. |
| 5,978,748 A | 11/1999 | Raab |
| 5,983,936 A | 11/1999 | Schwieterman et al. |
| 5,996,790 A | 12/1999 | Yamada et al. |
| 5,997,779 A | 12/1999 | Potter |
| D423,534 S | 4/2000 | Raab et al. |
| 6,050,615 A | 4/2000 | Weinhold |
| 6,060,889 A | 5/2000 | Hocker |
| 6,067,116 A | 5/2000 | Yamano et al. |
| 6,125,337 A | 9/2000 | Rosenberg et al. |
| 6,131,299 A | 10/2000 | Raab et al. |
| 6,151,789 A | 11/2000 | Raab et al. |
| 6,163,294 A | 12/2000 | Talbot |
| 6,166,504 A | 12/2000 | Iida et al. |
| 6,166,809 A | 12/2000 | Pettersen et al. |
| 6,166,811 A | 12/2000 | Long et al. |
| 6,219,928 B1 | 4/2001 | Raab et al. |
| D441,632 S | 5/2001 | Raab et al. |
| 6,240,651 B1 | 6/2001 | Schroeder et al. |
| 6,253,458 B1 | 7/2001 | Raab et al. |
| 6,282,195 B1 | 8/2001 | Miller et al. |
| 6,298,569 B1 | 10/2001 | Raab et al. |
| 6,366,831 B1 | 4/2002 | Raab |
| 6,418,774 B1 | 7/2002 | Brogaardh et al. |
| 6,438,856 B1 | 8/2002 | Kaczynski |
| 6,442,419 B1 | 8/2002 | Chu et al. |
| 6,470,584 B1 | 10/2002 | Stoodley |
| 6,477,784 B2 | 11/2002 | Schroeder et al. |
| 6,519,860 B1 | 2/2003 | Bieg et al. |
| D472,824 S | 4/2003 | Raab et al. |
| 6,547,397 B1 | 4/2003 | Kaufman et al. |
| 6,598,306 B2 | 7/2003 | Eaton |
| 6,611,346 B2 | 8/2003 | Granger |
| 6,611,617 B1 | 8/2003 | Crampton |
| 6,612,044 B2 | 9/2003 | Raab et al. |
| 6,621,065 B1 | 9/2003 | Fukumoto et al. |
| 6,626,339 B2 | 9/2003 | Gates et al. |
| 6,633,051 B1 | 10/2003 | Holloway et al. |
| 6,668,466 B1 | 12/2003 | Bieg et al. |
| D491,210 S | 6/2004 | Raab et al. |
| 6,764,185 B1 | 7/2004 | Beardsley et al. |
| 6,789,327 B2 | 9/2004 | Roth et al. |
| 6,820,346 B2 | 11/2004 | Raab et al. |
| 6,822,749 B1 | 11/2004 | Christoph |
| 6,826,664 B2 | 11/2004 | Hocker, III et al. |
| 6,868,359 B2 | 3/2005 | Raab |
| 6,879,933 B2 | 4/2005 | Steffey et al. |
| 6,892,465 B2 | 5/2005 | Raab et al. |
| 6,895,347 B2 | 5/2005 | Dorny et al. |
| 6,901,673 B1 | 6/2005 | Cobb et al. |
| 6,904,691 B2 | 6/2005 | Raab et al. |
| 6,920,697 B2 | 7/2005 | Raab et al. |
| 6,925,722 B2 | 8/2005 | Raab et al. |
| 6,931,745 B2 | 8/2005 | Granger |
| 6,935,748 B2 | 8/2005 | Kaufman et al. |
| 6,948,255 B2 | 9/2005 | Russell |
| 6,965,843 B2 | 11/2005 | Raab et al. |
| 7,003,892 B2 | 2/2006 | Eaton et al. |
| 7,006,084 B1 | 2/2006 | Buss et al. |
| 7,024,032 B2 | 4/2006 | Kidd et al. |
| 7,032,321 B2 | 4/2006 | Raab et al. |
| 7,040,136 B2 | 5/2006 | Forss et al. |
| 7,051,447 B2 | 5/2006 | Kikuchi et al. |
| 7,106,421 B2 | 9/2006 | Matsuura et al. |
| 7,117,107 B2 | 10/2006 | Dorny et al. |
| 7,120,092 B2 | 10/2006 | del Prado Pavon et al. |
| 7,152,456 B2 | 12/2006 | Eaton |
| 7,174,651 B2 | 2/2007 | Raab et al. |
| 7,184,047 B1 | 2/2007 | Crampton |
| 7,191,541 B1 | 3/2007 | Weekers et al. |
| 7,193,690 B2 | 3/2007 | Ossig et al. |
| 7,196,509 B2 | 3/2007 | Teng |
| 7,199,872 B2 | 4/2007 | Van Cranenbroeck |
| 7,230,689 B2 | 6/2007 | Lau |
| 7,242,590 B1 | 7/2007 | Yeap et al. |
| 7,249,421 B2 | 7/2007 | MacManus et al. |
| 7,269,910 B2 | 9/2007 | Raab et al. |
| 7,285,793 B2 | 10/2007 | Husted |
| 7,296,979 B2 | 11/2007 | Raab et al. |
| 7,306,339 B2 | 12/2007 | Kaufman et al. |
| 7,312,862 B2 | 12/2007 | Zumbrunn et al. |
| 7,313,264 B2 | 12/2007 | Crampton |
| 7,319,512 B2 | 1/2008 | Ohtomo et al. |
| 7,337,344 B2 | 2/2008 | Barman et al. |
| 7,348,822 B2 | 3/2008 | Baer |
| 7,352,446 B2 | 4/2008 | Bridges et al. |
| 7,360,648 B1 | 4/2008 | Blaschke |
| 7,372,558 B2 | 5/2008 | Kaufman et al. |
| 7,372,581 B2 | 5/2008 | Raab et al. |
| 7,383,638 B2 | 6/2008 | Granger |
| 7,388,654 B2 | 6/2008 | Raab et al. |
| 7,389,870 B2 | 6/2008 | Slappay |
| 7,395,606 B2 | 7/2008 | Crampton |
| 7,430,068 B2 | 9/2008 | Becker et al. |
| 7,447,931 B1 | 11/2008 | Rischar et al. |
| 7,449,876 B2 | 11/2008 | Pleasant et al. |
| 7,454,265 B2 | 11/2008 | Marsh |
| 7,463,368 B2 | 12/2008 | Morden et al. |
| 7,508,971 B2 | 3/2009 | Vaccaro et al. |
| 7,525,276 B2 | 4/2009 | Eaton |
| 7,545,517 B2 | 6/2009 | Rueb et al. |
| 7,546,689 B2 | 6/2009 | Ferrari et al. |

| | | | | | |
|---|---|---|---|---|---|
| 7,552,644 B2 | 6/2009 | Haase et al. | 2006/0056559 A1 | 3/2006 | Pleasant et al. |
| 7,561,598 B2 | 7/2009 | Stratton et al. | 2006/0059270 A1 | 3/2006 | Pleasant et al. |
| 7,564,250 B2 | 7/2009 | Hocker | 2006/0096108 A1 | 5/2006 | Raab et al. |
| 7,578,069 B2 | 8/2009 | Eaton | 2006/0123649 A1 | 6/2006 | Muller |
| D599,226 S | 9/2009 | Gerent et al. | 2006/0129349 A1 | 6/2006 | Raab et al. |
| 7,589,595 B2 | 9/2009 | Cutler | 2006/0169050 A1 | 8/2006 | Kobayashi et al. |
| 7,591,077 B2 | 9/2009 | Pettersson | 2006/0169608 A1 | 8/2006 | Carnevali |
| 7,591,078 B2 | 9/2009 | Crampton | 2006/0287769 A1 | 12/2006 | Yanagita et al. |
| 7,602,873 B2 | 10/2009 | Eidson | 2006/0291970 A1 | 12/2006 | Granger |
| 7,604,207 B2 | 10/2009 | Hasloecher et al. | 2007/0030841 A1 | 2/2007 | Lee et al. |
| 7,610,175 B2 | 10/2009 | Eidson | 2007/0043526 A1 | 2/2007 | De Jonge et al. |
| 7,614,157 B2 | 11/2009 | Granger | 2007/0050774 A1 | 3/2007 | Eldson et al. |
| 7,624,510 B2 | 12/2009 | Ferrari | 2007/0055806 A1 | 3/2007 | Stratton et al. |
| D607,350 S | 1/2010 | Cooduvalli et al. | 2007/0058162 A1 | 3/2007 | Granger |
| 7,656,751 B2 | 2/2010 | Rischar et al. | 2007/0097382 A1 | 5/2007 | Granger |
| 7,693,325 B2 | 4/2010 | Pulla et al. | 2007/0105238 A1 | 5/2007 | Mandl et al. |
| 7,701,592 B2 | 4/2010 | Saint Clair et al. | 2007/0142970 A1 | 6/2007 | Burbank et al. |
| 7,712,224 B2 | 5/2010 | Hicks | 2007/0147265 A1 | 6/2007 | Eidson |
| 7,721,396 B2 | 5/2010 | Fleischman | 2007/0147435 A1 | 6/2007 | Hamilton et al. |
| 7,735,234 B2 | 6/2010 | Briggs et al. | 2007/0147562 A1 | 6/2007 | Eidson |
| 7,743,524 B2 | 6/2010 | Eaton et al. | 2007/0153297 A1 | 7/2007 | Lau |
| 7,752,003 B2 | 7/2010 | MacManus | 2007/0163134 A1 | 7/2007 | Eaton |
| 7,765,707 B2 | 8/2010 | Tomelleri | 2007/0176648 A1 | 8/2007 | Baer |
| 7,769,559 B2 | 8/2010 | Reichert | 2007/0177016 A1 | 8/2007 | Wu |
| 7,774,949 B2 | 8/2010 | Ferrari | 2007/0183459 A1 | 8/2007 | Eidson |
| 7,779,548 B2 * | 8/2010 | Ferrari ............ 33/503 | 2007/0185682 A1 | 8/2007 | Eidson |
| 7,779,553 B2 | 8/2010 | Jordil et al. | 2007/0217169 A1 | 9/2007 | Yeap et al. |
| 7,800,758 B1 | 9/2010 | Bridges et al. | 2007/0217170 A1 | 9/2007 | Yeap et al. |
| 7,804,602 B2 | 9/2010 | Raab | 2007/0221522 A1 | 9/2007 | Yamada et al. |
| 7,805,851 B2 | 10/2010 | Pettersson | 2007/0223477 A1 | 9/2007 | Eidson |
| 7,805,854 B2 | 10/2010 | Eaton | 2007/0248122 A1 | 10/2007 | Hamilton |
| 7,809,518 B2 | 10/2010 | Zhu et al. | 2007/0256311 A1 | 11/2007 | Ferrari |
| RE42,055 E | 1/2011 | Raab et al. | 2007/0257660 A1 | 11/2007 | Pleasant et al. |
| RE42,082 E | 2/2011 | Raab et al. | 2007/0258378 A1 | 11/2007 | Hamilton |
| 7,881,896 B2 | 2/2011 | Atwell et al. | 2007/0282564 A1 | 12/2007 | Sprague et al. |
| 7,903,261 B2 | 3/2011 | Saint Clair et al. | 2008/0046221 A1 | 2/2008 | Stathis |
| 7,908,757 B2 * | 3/2011 | Ferrari ............ 33/503 | 2008/0052936 A1 | 3/2008 | Briggs et al. |
| 8,052,857 B2 | 11/2011 | Townsend | 2008/0066583 A1 | 3/2008 | Lott |
| 8,065,861 B2 | 11/2011 | Caputo | 2008/0068103 A1 | 3/2008 | Cutler |
| 8,082,673 B2 | 12/2011 | Desforges et al. | 2008/0080562 A1 | 4/2008 | Burch et al. |
| 8,099,877 B2 * | 1/2012 | Champ ............ 33/503 | 2008/0096108 A1 | 4/2008 | Sumiyama et al. |
| 8,123,350 B2 | 2/2012 | Cannell et al. | 2008/0098272 A1 | 4/2008 | Fairbanks et al. |
| 2001/0004269 A1 | 6/2001 | Shibata et al. | 2008/0148585 A1 | 6/2008 | Raab et al. |
| 2002/0032541 A1 | 3/2002 | Raab et al. | 2008/0154538 A1 | 6/2008 | Stathis |
| 2002/0087233 A1 | 7/2002 | Raab | 2008/0179206 A1 | 7/2008 | Feinstein et al. |
| 2002/0128790 A1 | 9/2002 | Woodmansee | 2008/0183065 A1 | 7/2008 | Goldbach |
| 2002/0170192 A1 | 11/2002 | Steffey et al. | 2008/0196260 A1 | 8/2008 | Pettersson |
| 2003/0033104 A1 | 2/2003 | Gooche | 2008/0204699 A1 | 8/2008 | Benz et al. |
| 2003/0053037 A1 | 3/2003 | Blaesing-Bangert et al. | 2008/0216552 A1 | 9/2008 | Ibach et al. |
| 2003/0125901 A1 | 7/2003 | Steffey et al. | 2008/0228331 A1 | 9/2008 | McNerney et al. |
| 2003/0142631 A1 | 7/2003 | Silvester | 2008/0232269 A1 | 9/2008 | Tatman et al. |
| 2003/0167647 A1 | 9/2003 | Raab et al. | 2008/0235969 A1 | 10/2008 | Jordil et al. |
| 2003/0172536 A1 | 9/2003 | Raab et al. | 2008/0235970 A1 | 10/2008 | Crampton |
| 2003/0172537 A1 | 9/2003 | Raab et al. | 2008/0240321 A1 | 10/2008 | Narus et al. |
| 2003/0208919 A1 | 11/2003 | Raab et al. | 2008/0245452 A1 | 10/2008 | Law et al. |
| 2003/0221326 A1 | 12/2003 | Raab et al. | 2008/0246943 A1 | 10/2008 | Kaufman et al. |
| 2004/0022416 A1 | 2/2004 | Lemelson et al. | 2008/0252671 A1 | 10/2008 | Cannell et al. |
| 2004/0040166 A1 | 3/2004 | Raab et al. | 2008/0256814 A1 | 10/2008 | Pettersson |
| 2004/0103547 A1 | 6/2004 | Raab et al. | 2008/0257023 A1 | 10/2008 | Jordil et al. |
| 2004/0111908 A1 | 6/2004 | Raab et al. | 2008/0263411 A1 | 10/2008 | Baney et al. |
| 2004/0139265 A1 | 7/2004 | Hocker, III et al. | 2008/0271332 A1 | 11/2008 | Jordil et al. |
| 2004/0162700 A1 | 8/2004 | Rosenberg et al. | 2008/0282564 A1 | 11/2008 | Pettersson |
| 2004/0259533 A1 | 12/2004 | Nixon et al. | 2008/0295349 A1 | 12/2008 | Uhl et al. |
| 2005/0016008 A1 | 1/2005 | Raab et al. | 2008/0298254 A1 | 12/2008 | Eidson |
| 2005/0028393 A1 | 2/2005 | Raab et al. | 2008/0309460 A1 | 12/2008 | Jefferson et al. |
| 2005/0085940 A1 | 4/2005 | Griggs et al. | 2009/0000136 A1 | 1/2009 | Crampton |
| 2005/0144799 A1 | 7/2005 | Raab et al. | 2009/0016475 A1 | 1/2009 | Rischar et al. |
| 2005/0151963 A1 | 7/2005 | Pulla et al. | 2009/0031575 A1 | 2/2009 | Tomelleri |
| 2005/0166413 A1 | 8/2005 | Crampton | 2009/0046140 A1 | 2/2009 | Lashmet et al. |
| 2005/0188557 A1 | 9/2005 | Raab et al. | 2009/0046895 A1 | 2/2009 | Pettersson et al. |
| 2005/0259271 A1 | 11/2005 | Christoph | 2009/0049704 A1 | 2/2009 | Styles et al. |
| 2005/0276466 A1 | 12/2005 | Vaccaro et al. | 2009/0083985 A1 | 4/2009 | Ferrari |
| 2005/0283989 A1 | 12/2005 | Pettersson | 2009/0089004 A1 | 4/2009 | Vook et al. |
| 2006/0016086 A1 | 1/2006 | Raab et al. | 2009/0089078 A1 | 4/2009 | Bursey |
| 2006/0017720 A1 | 1/2006 | Li | 2009/0089233 A1 | 4/2009 | Gach et al. |
| 2006/0026851 A1 | 2/2006 | Raab et al. | 2009/0089623 A1 | 4/2009 | Neering et al. |
| 2006/0028203 A1 | 2/2006 | Kawashima et al. | 2009/0109797 A1 | 4/2009 | Eidson |
| 2006/0053647 A1 | 3/2006 | Raab et al. | 2009/0113183 A1 | 4/2009 | Barford et al. |
| 2006/0056459 A1 | 3/2006 | Stratton et al. | 2009/0113229 A1 | 4/2009 | Cataldo et al. |

| | | | | | | |
|---|---|---|---|---|---|---|
| 2009/0122805 A1 | 5/2009 | Epps et al. | | EP | 0730210 | 9/1996 |
| 2009/0125196 A1 | 5/2009 | Velazquez et al. | | EP | 0730210 A1 | 9/1996 |
| 2009/0139105 A1 | 6/2009 | Granger | | EP | 0614517 | 3/1997 |
| 2009/0157419 A1 | 6/2009 | Bursey | | EP | 1160539 | 12/2001 |
| 2009/0165317 A1 | 7/2009 | Little | | EP | 1189124 | 3/2002 |
| 2009/0177435 A1 | 7/2009 | Heininen | | EP | 0767357 B1 | 5/2002 |
| 2009/0177438 A1 | 7/2009 | Raab | | EP | 1361414 A1 | 11/2003 |
| 2009/0187373 A1 | 7/2009 | Atwell et al. | | EP | 1468791 A1 | 10/2004 |
| 2009/0241360 A1 | 10/2009 | Tait et al. | | EP | 1669713 A1 | 6/2006 |
| 2009/0249634 A1 | 10/2009 | Pettersson | | EP | 1734425 A2 | 12/2006 |
| 2009/0265946 A1 | 10/2009 | Jordil et al. | | EP | 1429109 B1 | 4/2007 |
| 2010/0040742 A1 | 2/2010 | Dijkhuis et al. | | EP | 1764579 B1 | 12/2007 |
| 2010/0057392 A1 | 3/2010 | York | | EP | 1878543 | 1/2008 |
| 2010/0078866 A1 | 4/2010 | Pettersson | | EP | 1967930 | 9/2008 |
| 2010/0095542 A1* | 4/2010 | Ferrari .................. 33/503 | | EP | 2023077 A1 | 2/2009 |
| 2010/0122920 A1 | 5/2010 | Butter et al. | | EP | 2060530 A1 | 5/2009 |
| 2010/0123892 A1 | 5/2010 | Miller et al. | | EP | 2068067 A1 | 6/2009 |
| 2010/0128259 A1 | 5/2010 | Bridges et al. | | EP | 2108917 A1 | 10/2009 |
| 2010/0134596 A1 | 6/2010 | Becker | | EP | 2400261 | 12/2011 |
| 2010/0148013 A1 | 6/2010 | Bhotika et al. | | FR | 2935043 A1 | 2/2010 |
| 2010/0208062 A1 | 8/2010 | Pettersson | | GB | 894320 | 4/1962 |
| 2010/0277747 A1 | 11/2010 | Rueb et al. | | GB | 2255648 | 11/1992 |
| 2010/0281705 A1 | 11/2010 | Verdi et al. | | GB | 2255648 A | 11/1992 |
| 2010/0286941 A1 | 11/2010 | Merlot | | GB | 2341203 A | 3/2000 |
| 2010/0312524 A1 | 12/2010 | Siercks et al. | | GB | 2420241 A | 5/2006 |
| 2010/0318319 A1 | 12/2010 | Maierhofer | | GB | 2452033 | 2/2009 |
| 2010/0325907 A1 | 12/2010 | Tait | | GB | 2452033 A | 2/2009 |
| 2011/0007305 A1 | 1/2011 | Bridges et al. | | JP | 5581525 | 6/1955 |
| 2011/0007326 A1 | 1/2011 | Daxauer et al. | | JP | 5827264 | 2/1983 |
| 2011/0013199 A1 | 1/2011 | Siercks et al. | | JP | 6313710 A | 11/1994 |
| 2011/0019155 A1 | 1/2011 | Daniel et al. | | JP | 7210586 A | 8/1995 |
| 2011/0023578 A1 | 2/2011 | Grasser | | JP | 2003194526 | 7/2003 |
| 2011/0043515 A1 | 2/2011 | Stathis | | JP | 2004257927 A | 9/2004 |
| 2011/0094908 A1 | 4/2011 | Trieu | | JP | 2005517908 | 6/2005 |
| 2011/0107611 A1 | 5/2011 | Desforges et al. | | JP | 2006241833 | 9/2006 |
| 2011/0107612 A1 | 5/2011 | Ferrari et al. | | JP | 2006301991 A | 11/2006 |
| 2011/0107613 A1 | 5/2011 | Tait | | JP | 2009524057 | 6/2009 |
| 2011/0107614 A1 | 5/2011 | Champ | | WO | 9208568 A1 | 5/1992 |
| 2011/0111849 A1 | 5/2011 | Sprague et al. | | WO | 9808050 | 2/1998 |
| 2011/0112786 A1 | 5/2011 | Desforges et al. | | WO | 9910706 A1 | 3/1999 |
| 2011/0164114 A1 | 7/2011 | Kobayashi et al. | | WO | 0014474 | 3/2000 |
| 2011/0173827 A1 | 7/2011 | Bailey et al. | | WO | 0033149 | 6/2000 |
| 2011/0173828 A1 | 7/2011 | York | | WO | 0034733 | 6/2000 |
| 2011/0178755 A1 | 7/2011 | York | | WO | 02101323 A2 | 12/2002 |
| 2011/0178762 A1 | 7/2011 | York | | WO | 2004096502 A1 | 11/2004 |
| 2011/0178764 A1 | 7/2011 | York | | WO | 2005072917 | 8/2005 |
| 2011/0178765 A1 | 7/2011 | Atwell et al. | | WO | 2005075875 | 8/2005 |
| 2011/0192043 A1 | 8/2011 | Ferrari | | WO | 2005100908 A1 | 10/2005 |
| 2011/0273568 A1 | 11/2011 | Lagassey | | WO | 2006051264 A1 | 5/2006 |
| 2012/0181194 A1 | 7/2012 | McEwan et al. | | WO | 2007002319 A1 | 1/2007 |
| 2012/0210678 A1 | 8/2012 | Alcouloumre et al. | | WO | 2007028941 A1 | 3/2007 |
| 2012/0260611 A1 | 10/2012 | Jones | | WO | 2007125081 A1 | 11/2007 |
| 2013/0025143 A1 | 1/2013 | Bailey et al. | | WO | 2007144906 A1 | 12/2007 |
| 2013/0025144 A1 | 1/2013 | Briggs et al. | | WO | 2008027588 | 3/2008 |
| 2013/0062243 A1 | 3/2013 | Chang et al. | | WO | 2008027588 A2 | 3/2008 |
| | | | | WO | 2008047171 | 4/2008 |
| FOREIGN PATENT DOCUMENTS | | | | WO | 2008064276 A3 | 5/2008 |
| CN | 2665668 | 12/2004 | | WO | 2008066896 | 6/2008 |
| CN | 1818537 | 8/2006 | | WO | 2008075170 A1 | 6/2008 |
| CN | 201266071 | 7/2009 | | WO | 2008157061 | 12/2008 |
| DE | 3245060 A1 | 7/1983 | | WO | 2009001165 A1 | 12/2008 |
| DE | 4410775 A1 | 10/1995 | | WO | 2009016185 A1 | 2/2009 |
| DE | 29622033 | 2/1997 | | WO | 2009083452 A1 | 7/2009 |
| DE | 19543763 A1 | 5/1997 | | WO | 2009127526 A1 | 10/2009 |
| DE | 19820307 A1 | 11/1999 | | WO | 2009130169 A1 | 10/2009 |
| DE | 10026357 A1 | 1/2002 | | WO | 2009149740 A1 | 12/2009 |
| DE | 202005000983 U1 | 4/2005 | | WO | 2010040742 | 4/2010 |
| DE | 102004015668 B3 | 9/2005 | | WO | 2010092131 A1 | 8/2010 |
| DE | 19720049 B4 | 1/2006 | | WO | 2010108089 A2 | 9/2010 |
| DE | 10114126 B4 | 8/2006 | | WO | 2010148525 A1 | 12/2010 |
| DE | 102004010083 B4 | 11/2006 | | WO | 2011000435 A1 | 1/2011 |
| DE | 102005060967 A1 | 6/2007 | | WO | 2011000955 A1 | 1/2011 |
| DE | 102006023902 | 11/2007 | | WO | 2011/057130 A2 | 5/2011 |
| DE | 102006035292 A1 | 1/2008 | | WO | 2011057130 | 5/2011 |
| DE | 102008039838 A1 | 3/2010 | | WO | 2012038446 | 3/2012 |
| DE | 102005036929 B4 | 6/2010 | | | | |
| DE | 102008062763 B3 | 7/2010 | | OTHER PUBLICATIONS | | |
| DE | 102009001894 | 9/2010 | | | | |
| EP | 0546784 A2 | 6/1993 | | International Preliminary Report on Patentability for International Application Serial No. PCT/US2011/021249 International filing date | | |

Jan. 14, 2011. Date of Issuance Jul. 24, 2012.
International Preliminary Report on Patentability for International Application Serial No. PCT/US2011/021250 International filing date Jan. 14, 2011. Date of Issuance Jul. 24, 2012.
International Preliminary Report on Patentability for International Application Serial No. PCT/US2011/021252 International filing date Jan. 14, 2011. Date of Issuance Jul. 24, 2012.
International Preliminary Report on Patentability for International Application Serial No. PCT/US2011/021247 International filing date Jan. 14, 2011. Date of Issuance Jul. 24, 2012.
International Preliminary Report on Patentability for International Application Serial No. PCT/US2011/021259. International filing date Jan. 14, 2011. Date of Issuance Jul. 24, 2012.
International Preliminary Report on Patentability for International Application Serial No. PCT/US2011/021262. International filing date Jan. 14, 2011. Date of Issuance Jul. 24, 2012.
International Preliminary Report on Patentability for International Application Serial No. PCT/US2011/021263. International filing date Jan. 14, 2011. Date of Issuance Jul. 24, 2012.
International Preliminary Report on Patentability for International Application Serial No. PCT/US2011/021264. International filing date Jan. 14, 2011. Date of Issuance Jul. 24, 2012.
International Preliminary Report on Patentability for International Application Serial No. PCT/US2011/021270. International filing date Jan. 14, 2011. Date of Issuance Jul. 24, 2012.
International Preliminary Report on Patentability for International Application Serial No. PCT/US2011/021272. International filing date Jan. 14, 2011. Date of Issuance Jul. 24, 2012.
International Preliminary Report on Patentability for International Application Serial No. PCT/US2011/021273. International filing date Jan. 14, 2011. Date of Issuance Jul. 24, 2012.
International Preliminary Report on Patentability for International Application Serial No. PCT/US2011/021276. International filing date Jan. 14, 2011. Date of Issuance Jul. 24, 2012.
International Preliminary Report on Patentability for International Application Serial No. PCT/US2011/021278. International filing date Jan. 14, 2011. Date of Issuance Jul. 24, 2012.
International Preliminary Report on Patentability for International Application Serial No. PCT/US2011/021794. International filing date Jan. 20, 2011. Date of Issuance Jul. 24, 2012.
International Preliminary Report on Patentability for PCT/US2011/020625; Date of Issuance Jul. 17, 2012.
International Search Report for International Application No. PCT/US2011/021247 mailed Aug. 26, 2011.
Written Opinion of the International Searching Authority for International Application No. PCT/US2011/021247 mailed Aug. 26, 2011.
Romer "Romer Absolute Arm Product Brochure" (2010); Hexagon Metrology; www.hexagonmetrology.com; Hexagon AB 2010.
Romer "Romer Absolute Arm Maximum Performance Portable Measurement" (Printed Oct. 2010); Hexagon Metrology, Inc. http://us:ROMER.com; Hexagon Metrology, Inc 2010.
International Preliminary Report on Patentability mailed May 9, 2012 for International Application Serial No. PCT/US2011/021253 International filing date Jan. 14, 2011. Date of Completion May 9, 2012.
GoMeasure3D—Your source for all things measurement, Baces 3D 100 Series Portable CMM from GoMeasure3D, [online], [retrieved Nov. 29, 2011], http://www.gomeasure3d.com/baces100.html.
It is Alive in the Lab, Autodesk University, Fun with the Immersion MicroScribe Laser Scanner, [online], [retrieved Nov. 29, 2011], http://labs.blogs.com/its_alive_in_the_lab/2007/11/fun-with-the-im.html.
Ghost 3D Systems, Authorized MicroScribe Solutions, FAQs—MicroScribe 3D Laser, MicroScan Tools, & related info, [online], [retrieved Nov. 29, 2011], http://microscribe.ghost3d.com/gt_microscan-3d_faqs.htm.
Electro-Optical Information Systems, "The Handy Handheld Digitizer" [online], [retrieved on Nov. 29, 2011], http://vidibotics.com/htm/handy.htm.
Kreon Laser Scanners, Getting the Best in Cutting Edge 3D Digitizing Technology, B3-D MCAD Consulting/Sales [online], [retrieved Nov. 29, 2011], http://www.b3-d.com/Kreon.html.

MicroScan 3D User Guide, RSI GmbH, 3D Systems & Software, Oberursel, Germany, email: info@rsi-gmbh.de, Copyright RSI Roland Seifert Imaging GmbH 2008.
Laser Reverse Engineering with Microscribe, [online], [retrieved Nov. 29, 2011], http://www.youtube.com/watch?v=8VRz_2aEJ4E& feature=PlayList&p=F63ABF74F30DC81B& playnext=1& playnext_from=PL&index=1.
Information on Electro-Optical Information Systems; EOIS 3D Mini-Moire C.M.M. Sensor for Non-Contact Measuring & Surface Mapping; Direct Dimensions, Jun. 1995.
A. Hart; "Kinematic Coupling Interchangibility" Precision Engineering; vol. 28, No. 1; Jan. 1, 2004 pp. 1-15.
International Preliminary Report on Patentability for PCT/US2011/021274; Date of Completion Apr. 12, 2012.
International Search Report and Written Opinion for International Application No. PCT/US2011/021273 filed Jan. 14, 2011.
International Search Report for International Application No. PCT/US20111050787; Mailing date Nov. 3, 2011.
Patrick Willoughby; "Elastically Averaged Precision Alignment"; In: "Doctoral Thesis"; Jun. 1, 2005; Massachusetts Institute of Technology; XP55005620; Abstract 1.1 Motivation; Chapter 3, Chapter 6.
Romer "Romer Absolute Arm Maximum Performance Portable Measurement" (Printed Oct. 2010); Hexagon Metrology, Inc. htt://us:ROMER.com; Hexagon Metrology, Inc., 2010.
Romer Romer Absolute Arm Product Brochure: (2010); Hexagon Metrology; www.hexagonmetrology.com; Hexagon AB, 2010.
Trimble—Trimble SPS630, SPS730 and SPS930 Universal Total Stations, [on-line] http://www.trimble.com/sps630_730_930.shtml (1 of 4), [Retrieved Jan. 26, 2010 8:50:29AM].
Written Opinion of the International Searching Authority for International Application No. PCT/US2011/021253 mailed Mar. 22, 2012.
ABB Flexible Automation AB: "Product Manual IRB 6400R M99, On-line Manual"; Sep. 13, 2006; XP00002657684; Retrieved from the Internet: URL: http://pergatory.mit.edu/kinematiccouplings/case_studies/ABB_Robotics/general/6400R%20Product%20Manual.pdf (retrieved Aug. 26, 2011).
Anonymous : So wird's gemacht: Mit T-DSL und Windows XP Home Edition gemeinsam ins Internet (Teil 3) Internet Citation, Jul. 2003, XP002364586, Retrieved from Internet: URL:http://support.microsfot.com/kb/814538/DE/ [retrieved on Jan. 26, 2006] the whole document.
Hart, A., "Kinematic Coupling Interchangeability", Precision Engineering, vol. 28, No. 1, Jan. 1, 2004, pp. 1-15, XP55005507, ISSN: 0141-6359, DOI: 10.1016/S0141-6359(03)00071-0.
International Search Report for International Application No. PCT/US2011/021248 mailed Sep. 19, 2011.
International Search Report for International Application No. PCT/US2011/021253 mailed Sep. 26, 2011.
International Search Report for International Application No. PCT/US2011/021794 mailed Sep. 23, 2011.
International Search Report for International Patent Application PCT/US2011/050787; mailing date Nov. 3, 2011.
Willoughby, P., "Elastically Averaged Precisoin Alignment", in: "Doctoral Thesis", Jun. 1, 2005, Massachusetts Institute of Technology, XP55005620, abstract 1.1 Motivation, Chapter 3, Chapter 6.
Written Opinion of the International Searching Authority for International Application No. PCT/US2011/021248 mailed Sep. 19, 2011.
Written Opinion of the International Searching Authority for International Application No. PCT/US2011/021253 mailed Sep. 26, 2011.
Written Opinion of the International Searching Authority for International Application No. PCT/US2011/021794 mailed Sep. 23, 2011.
Written Opinion of the International Searching Authority for International Patent Application PCT/US2011/050787; mailing date Nov. 3, 2011.
Dylan, Craig R., High Precision Makes the Massive Bay Bridge Project Work. Suspended in MidAir—Cover Story—Point of Beginning, Jan. 1, 2010, [online] http://www.pobonline.com/Articles/Cover_Story/BNP_GUID_9-5-2006_A_10000000000... [Retrieved Jan. 25, 2010].

Franklin, Paul F., What IEEE 1588 Means for Your Next T&M System Design, Keithley Instruments, Inc., [on-line] Oct. 19, 2010, http://www.eetimes.com/General/ DisplayPrintViewContent?contentItemId=4209746, [Retreived Oct. 21, 2010].

HYDROpro Navigation, Hydropgraphic Survey Software, Trimble, www.trimble.com, Copyright 1997-2003.

Anonymous : So wird's gemacht: Mit T-DSL and Windows XP Home Edition gemeinsam ins Internet (Tell 3) Internet Citation, Jul. 2003, XP002364586, Retrieved from Internet: URL:http://support. microsfot.com/kb/814538/DE/[retrieved on Jan. 26, 2006]eh whole document.

Cho, et al., Implementation of a Precision Time Protocol over Low Rate Wireless Personal Area Networks, IEEE, 2008.

Cooklev, et al., An Implementation of IEEE 1588 Over IEEE 802.11b for Syncrhonization of Wireless Local Area Network Nodes, IEEE Transactions on Instrumentation and Measurement, vol. 56, No. 5, Oct. 2007.

International Search Report for International Application No. PCT/ 2011/020625 mailed Feb. 25, 2011.

International Search Report for International Application No. PCT/ US2011/021270 mailed May 2, 2011.

International Search Report for International Application No. PCT2011/021274 filed Jan. 14, 2011.

International Search Report for International Application No. PCT2011/021276 filed Jan. 14, 2011.

International Search Report for International Application No. PCT/ US2011/021246 mailed Apr. 12, 2011.

International Search Report for International Application No. PCT/ US2011/021249 mailed Apr. 21, 2011.

Internation Search Report for International Application No. PCT/ US2011/021250 mailed Apr. 18, 2011.

International Search Report for International Application No. PCT/ US2011/021252 mailed Apr. 27, 2011.

International Search Report for International Application No. PCT/ US2011/021259 mailed May 25, 2011.

International Search Report for International Application No. PCT/ US2011/021262 mailed May 11, 2011.

International Search Report for International Application No. PCT/ US2011/021263 mailed May 4, 2011.

International Search Report for International Application No. PCT/ US2011/021264 mailed May 31, 2011.

International Search Report for International Application No. PCT/ US2011/021272 mailed Apr. 7, 2011.

International Search Report for International Application No. PCT/ US2011/021278 mailed May 25, 2011.

Jasperneite, et al., Enhancements to the Time Synchronization Standard IEEE-1588 for a System of Cascaded Bridges, IEEE, 2004.

Sauter, et al., Towards New Hybrid Networks for Industrial Automation, IEEE, 2009.

Spada, et al., IEEE 1588 Lowers Integration Costs in Continuous Flow Automated Production Lines, XP-002498255, ARC Insights, Insight # 2003-33MD&H, Aug. 20, 2003.

Written Opinion of the International Searching Authority for International Application No. PCT/US2011/021246 mailed Apr. 12, 2011.

Written Opinion of the International Searching Authority for International Application No. PCT/US2011/021249 mailed Apr. 21, 2011.

Written Opinion of the International Searching Authority for International Application No. PCT/US2011/021250 mailed Apr. 18, 2011.

Written Opinion of the International Searching Authority for International Application No. PCT/US2011/021252 mailed Apr. 27, 2011.

Written Opinion of the International Searching Authority for International Application No. PCT/US2011/021259 mailed May 25, 2011.

Written Opinion of the International Searching Authority for International Application No. PCT/US2011/021262 mailed May 11, 2011.

Written Opinion of the International Searching Authority for International Application No. PCT/US2011/021263 mailed May 4, 2011.

Written Opinion of the International Searching Authority for International Application No. PCT/US2011/021264 mailed May 31, 2011.

Written Opinion of the International Searching Authority for International Application No. PCT/US2011/021272 mailed Apr. 7, 2011.

Written Opinion for International Application No. PCT/US2011/ 021273 mailed Jan. 14, 2011.

Written Opinion of the International Searching Authority for International Application No. PCT/US2011/021278 mailed May 25, 2011.

Written Opinion of the International Searching Authority for International Application No. PCT/US2011/020625 mailed Feb. 25, 2011.

Written Opinion of the International Searching Authority for Internationl Application No. PCT/US2011/021270 mailed May 2, 2011.

Written Opinion for International Application No. PCT2011/021274 filed Jan. 14, 2011.

Written Opinion for International Application No. PCT/US2011/ 021276 filed Jan. 14, 2011.

Examination Report under Section 18(3); Report dated Nov. 1, 2012; Application No. GB1210311.5.

Examination Report under Section 18(3); Report dated Nov. 6, 2012; Application No. GB1210306.5.

Examination Report under Section 18(3); Report dated Oct. 31, 2012; Application No. GB1210309.9.

German Office Action and English Language summary for DE 112011100292.0 filed Jul. 3, 2012, based on PCT Application US2011/021252 filed Jan. 14, 2011.

German Office Action for Patent Application No. 11 2011 100 291.2 dated Dec. 20, 2012. All art cited within.

Japanese Office Action and English Language summary for JP2012-550042 filed Jul. 20, 2012; based on International Application No. PCT/US2011/021249 filed Jan. 14, 2011.

Japanese Office Action and English Language summary for JP2012-550044 filed Jul. 20, 2012; based on International Application No. PCT/US2011/021252 filed Jan. 14, 2011.

Japanese Office Action and English Language summary for JP2012-550043 filed Jul. 20, 2012; based on International Application No. PCT/US2011/021250 filed Jan. 14, 2011.

Examination Report for German Application No. 11 2011 100 193.2 Report dated Dec., 20, 2012; based on PCT/US2011/021249.

FARO Product Catalog; Faro Arm; 68 pages; Faro Technologies Inc. 2009; printed Aug. 3, 2009.

Romer Measuring Arms; Portable CMMs for the shop floor; 20 pages; Hexagon Metrology, Inc. (2009) http//us.ROMER.com.

International Search Report of the International Searching Authority for Application No. PCT/US2013/022186; Date of Mailing: May 29, 2013.

Written Opinion of the International Searching Authority for Application No. PCT/US2013/022186; Date of Mailing: May 29, 2013.

MG Lee; "Compact 3D LIDAR based on optically coupled horizontal and vertical Scanning mechanism for the autonomous navigation of robots" (13 pages) vol. 8037; downloaded from http://proceedings. spiedigitallibrary.org/ on Jul. 2, 2013.

P. Ben-Tzvi, et al "Extraction of 3D Images Using Pitch-Actuated 2D Laser Range Finder for Robotic Vision" (6 pages) BNSDOCID <XP 31840390A_1_>.

International Search Report for International Application No. PCT/ US2013/040321 mailed Jul. 15, 2013.

YK Cho, et al. "Light-weight 3D LADAR System for Construction Robotic Operations" (pp. 237-244); 26th International Symposium on Automation and Robotics in Construction (ISARC 2009).

Written Opinion for International Application No. PCT/US2013/ 040321 mailed Jul. 15, 2013.

Romer "Romer Measuring Arms Portable CMMs for R&D and shop floor" (Mar. 2009) Hexagon Metrology (16 pages).

Examination Report for German Application No. 11 2011 100 290.4 Report dated Jul. 16, 2013; based on PCT/US2011/021247.

Jgeng "DLP-Based Structured Light 3D Imaging Technologies and Applications" (15 pages) Emerging Digital Micromirror Device Based Systems and Application III; edited by Michael R. Douglass, Patrick I. Oden, Proc. of SPIE, vol. 7932, 79320B; (2011) SPIE.

International Search Report for International Application No. PCT/ US/2013/041826 filed May 20, 2013; mailed Jul. 29, 2013.

Written Opinion for International Application No. PCT/US/2013/041826 filed May 20, 2013; mailed Jul. 29, 2013.
International Search Report for International Application No. PCT/US2013/040309 mailed Jul. 15, 2013.

Written Opinion for International Application No. PCT/US2013/040309 mailed Jul. 15, 2013.

* cited by examiner

US 8,533,967 B2

COORDINATE MEASUREMENT MACHINES WITH REMOVABLE ACCESSORIES

CROSS-REFERENCE TO RELATED APPLICATIONS

The present application claims the benefit of provisional application No. 61/296,555 filed Jan. 20, 2010, provisional application No. 61/355,279 filed Jun. 16, 2010, and provisional application No. 61/351,347 filed on Jun. 4, 2010, the contents of which are hereby incorporated by reference in their entirety.

BACKGROUND

The present disclosure relates to a coordinate measuring machine, and more particularly to a portable articulated arm coordinate measuring machine having a connector on a probe end of the coordinate measuring machine that allows accessory devices to be removably connected to the coordinate measuring machine.

Portable articulated arm coordinate measuring machines (AACMMs) have found widespread use in the manufacturing or production of parts where there is a need to rapidly and accurately verify the dimensions of the part during various stages of the manufacturing or production (e.g., machining) of the part. Portable AACMMs represent a vast improvement over known stationary or fixed, cost-intensive and relatively difficult to use measurement installations, particularly in the amount of time it takes to perform dimensional measurements of relatively complex parts. Typically, a user of a portable AACMM simply guides a probe along the surface of the part or object to be measured. The measurement data are then recorded and provided to the user. In some cases, the data are provided to the user in visual form, for example, three-dimensional (3-D) form on a computer screen. In other cases, the data are provided to the user in numeric form, for example when measuring the diameter of a hole, the text "Diameter=1.0034" is displayed on a computer screen.

An example of a prior art portable articulated arm CMM is disclosed in commonly assigned U.S. Pat. No. 5,402,582 ('582), which is incorporated herein by reference in its entirety. The '582 patent discloses a 3-D measuring system comprised of a manually-operated articulated arm CMM having a support base on one end and a measurement probe at the other end. Commonly assigned U.S. Pat. No. 5,611,147 ('147), which is incorporated herein by reference in its entirety, discloses a similar articulated arm CMM. In the '147 patent, the articulated arm CMM includes a number of features including an additional rotational axis at the probe end, thereby providing for an arm with either a two-two-two or a two-two-three axis configuration (the latter case being a seven axis arm).

While existing CMM's are suitable for their intended purposes, what is needed is a portable AACMM that has certain features of embodiments of the present invention.

SUMMARY OF THE INVENTION

In accordance with one embodiment of the invention, a portable articulated arm coordinate measuring machine (AACMM) for measuring the coordinates of an object in space is provided. The AACMM includes a base. A manually positionable arm portion is provided having an opposed first end and second end, the arm portion being rotationally coupled to the base, the arm portion including a plurality of connected arm segments, each arm segment including at least one position transducer for producing a position signal. A measurement device is coupled to the first end. An electronic circuit receives the position signal from the at least one position transducer and provides data corresponding to a position of the measurement device. A probe end is disposed between the measurement device and the first end, the probe end having a fastener and a first connector. A device is removably coupled to the probe end by the fastener, the device having a second connector arranged to engage the first connector when the fastener couples the device to the probe end.

According to another embodiment of the invention, an AACMM for measuring the coordinates of an object in space is provided. The AACMM includes a manually positionable arm portion having an opposed first end and second end, the arm portion including a plurality of connected arm segments, each arm segment including at least one position transducer for producing a position signal. A measurement device is coupled to the first end. An electronic circuit receives the position signal from the at least one position transducer and provides data corresponding to a position of the measurement device. A housing is disposed between the first end and the measurement device. A first controller is disposed within the housing. A first coupler is arranged on one side of the housing. A device is removably coupled to the housing and having a handle portion, the device having a second coupler on one end arranged to engage the first coupler, thereby securing the device to the housing.

According to another embodiment of the invention, a method of operating an AACMM for measuring the coordinates of an object in space is provided. The method includes providing a manually positionable arm portion having an opposed first end and second end, the arm portion including a plurality of connected arm segments, each arm segment including at least one position transducer for producing a position signal. A probe end is provided for measuring the object, the probe end having a first controller, the probe end having a first electrical connector electrically coupled to the first controller and a fastener, the probe end being coupled to the first end. A measurement device is provided that is operably coupled to probe end. An electronic circuit receives the position signals from the transducers. Data corresponding to a position of the measurement device is determined with the electronic circuit. A device is provided having a second controller, the device having a second electrical connector is electrically coupled to the second controller and a coupler. The device is mechanically coupled to the probe end with the coupler and the fastener. The first electrical connector is electrically coupled to the second electrical connector. A first signal is transmitted from the second controller to the first controller.

In accordance with another embodiment of the invention, an AACMM for measuring the coordinates of an object in space is provided. The AACMM includes a base. A manually positionable arm portion is provided having an opposed first end and second end, the arm portion being rotationally coupled to the base, the arm portion including a plurality of connected arm segments, each arm segment including at least one position transducer for producing a position signal. A probe end is coupled to the first end. An electronic circuit receives the position signal from the at least one position transducer and provides data corresponding to a position of the probe end. A first projector is removably coupled to the probe end, the first projector being operable to project a first information onto a first projection surface, the projected first information being indicative of a presence and location of one or more features associated with the first projection surface.

In accordance with another embodiment of the invention, a removable accessory for an AACMM for measuring the coordinates of an object in space is provided. The AACMM includes a probe end coupled to an end of the AACMM, the probe end having a first mechanical coupler and a first electrical connector. The removable accessory includes a second mechanical coupler removably coupled to the first mechanical coupler. A handle portion is coupled to the second mechanical coupler.

BRIEF DESCRIPTION OF THE DRAWINGS

Referring now to the drawings, exemplary embodiments are shown which should not be construed to be limiting regarding the entire scope of the disclosure, and wherein the elements are numbered alike in several FIGURES:

FIG. 1, including

FIG. 14, including

FIG. 15, including

DETAILED DESCRIPTION

Portable articulated arm coordinate measuring machines ("AACMM") are used in a variety of applications to obtain measurements of objects. Embodiments of the present invention provide advantages in allowing an operator to easily and quickly couple different measurement accessory devices to a probe end of the AACMM. Embodiments of the present invention provide further advantages in providing for integrating some level of control of the probe end with the accessory device. Embodiments of the present invention provide still further advantages in providing power and data communications to a removable accessory without having external connections or wiring.

Figure 1A:
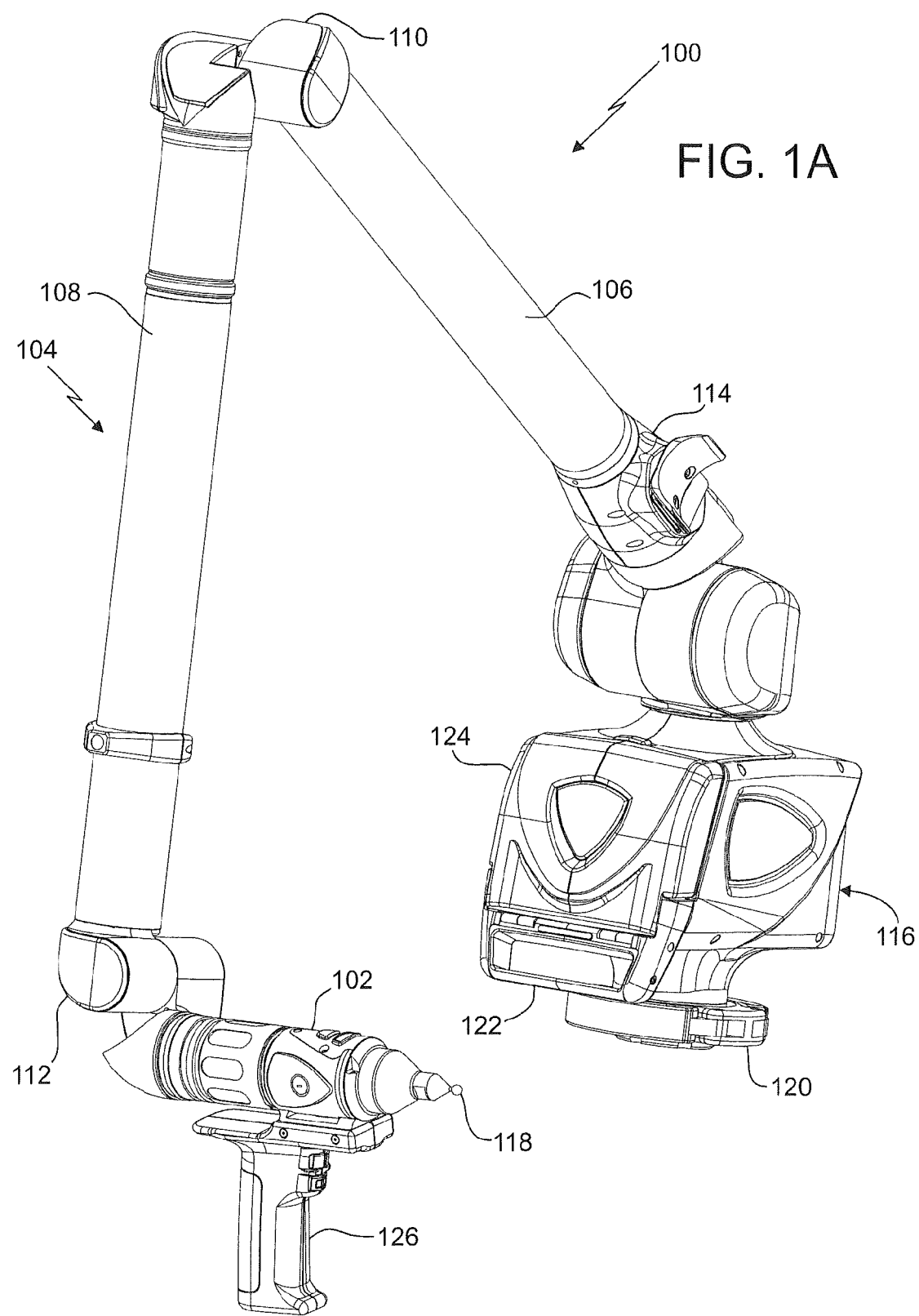
FIGS. 1A and 1B, are perspective views of a portable articulated arm coordinate measuring machine (AACMM) having embodiments of various aspects of the present invention therewithin.
Figure 1B:
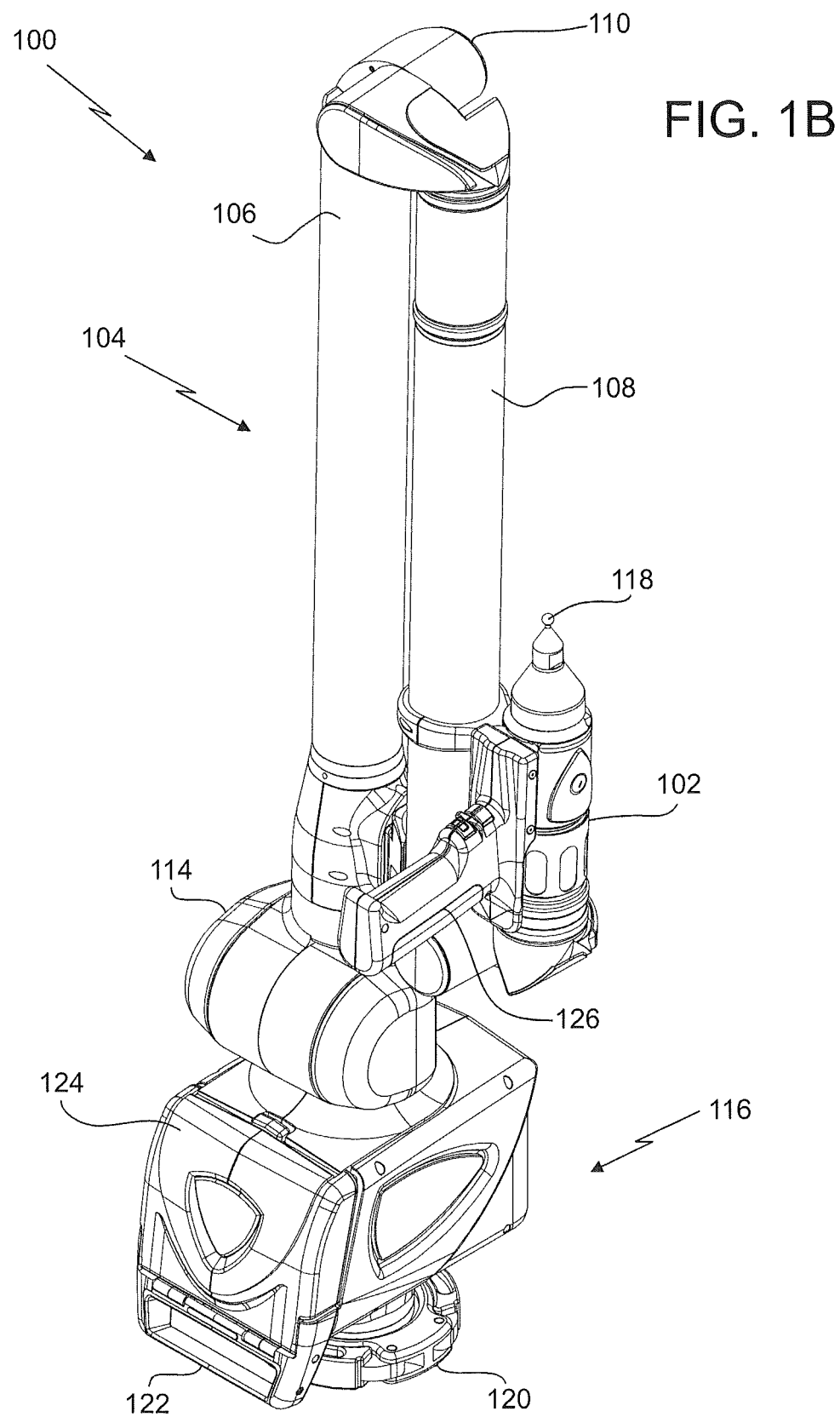

FIGS. 1A and 1B illustrate, in perspective, an AACMM 100 according to various embodiments of the present invention, an articulated arm being one type of coordinate measuring machine. As shown in FIGS. 1A and 1B, the exemplary AACMM 100 may comprise a six or seven axis articulated measurement device having a probe end 401 that includes a measurement probe housing 102 coupled to an arm portion 104 of the AACMM 100 at one end. The arm portion 104 comprises a first arm segment 106 coupled to a second arm segment 108 by a first grouping of bearing cartridges 110 (e.g., two bearing cartridges). A second grouping of bearing cartridges 112 (e.g., two bearing cartridges) couples the second arm segment 108 to the measurement probe housing 102. A third grouping of bearing cartridges 114 (e.g., three bearing cartridges) couples the first arm segment 106 to a base 116 located at the other end of the arm portion 104 of the AACMM 100. Each grouping of bearing cartridges 110, 112, 114 provides for multiple axes of articulated movement. Also, the probe end 401 may include a measurement probe housing 102 that comprises the shaft of the seventh axis portion of the AACMM 100 (e.g., a cartridge containing an encoder system that determines movement of the measurement device, for example a probe 118, in the seventh axis of the AACMM 100). In this embodiment, the probe end 401 may rotate about an axis extending through the center of measurement probe housing 102. In use of the AACMM 100, the base 116 is typically affixed to a work surface.

Each bearing cartridge within each bearing cartridge grouping 110, 112, 114 typically contains an encoder system (e.g., an optical angular encoder system). The encoder system (i.e., transducer) provides an indication of the position of the respective arm segments 106, 108 and corresponding bearing cartridge groupings 110, 112, 114 that all together provide an indication of the position of the probe 118 with respect to the base 116 (and, thus, the position of the object being measured by the AACMM 100 in a certain frame of reference—for example a local or global frame of reference). The arm segments 106, 108 may be made from a suitably rigid material such as but not limited to a carbon composite material for example. A portable AACMM 100 with six or seven axes of articulated movement (i.e., degrees of freedom) provides advantages in allowing the operator to position the probe 118 in a desired location within a 360° area about the base 116 while providing an arm portion 104 that may be easily handled by the operator. However, it should be appreciated that the illustration of an arm portion 104 having two arm segments 106, 108 is for exemplary purposes, and the claimed invention should not be so limited. An AACMM 100 may have any number of arm segments coupled together by bearing cartridges (and, thus, more or less than six or seven axes of articulated movement or degrees of freedom).

The probe 118 is detachably mounted to the measurement probe housing 102, which is connected to bearing cartridge grouping 112. A handle 126 is removable with respect to the measurement probe housing 102 by way of, for example, a quick-connect interface. The handle 126 may be replaced with another device (e.g., a laser line probe, a bar code reader), thereby providing advantages in allowing the operator to use different measurement devices with the same AACMM 100. In exemplary embodiments, the probe housing 102 houses a removable probe 118, which is a contacting measurement device and may have different tips 118 that physically contact the object to be measured, including, but not limited to: ball, touch-sensitive, curved and extension type probes. In other embodiments, the measurement is performed, for example, by a non-contacting device such as a laser line probe (LLP). In an embodiment, the handle 126 is replaced with the LLP using the quick-connect interface. Other types of measurement devices may replace the removable handle 126 to provide additional functionality. Examples of such measurement devices include, but are not limited to, one or more illumination lights, a temperature sensor, a thermal scanner, a bar code scanner, a projector, a paint sprayer, a camera, or the like, for example.

As shown in FIGS. 1A and 1B, the AACMM 100 includes the removable handle 126 that provides advantages in allowing accessories or functionality to be changed without removing the measurement probe housing 102 from the bearing cartridge grouping 112. As discussed in more detail below with respect to FIG. 2, the removable handle 126 may also include an electrical connector that allows electrical power and data to be exchanged with the handle 126 and the corresponding electronics located in the probe end 401.

In various embodiments, each grouping of bearing cartridges 110, 112, 114 allows the arm portion 104 of the AACMM 100 to move about multiple axes of rotation. As mentioned, each bearing cartridge grouping 110, 112, 114 includes corresponding encoder systems, such as optical angular encoders for example, that are each arranged coaxially with the corresponding axis of rotation of, e.g., the arm segments 106, 108. The optical encoder system detects rotational (swivel) or transverse (hinge) movement of, e.g., each one of the arm segments 106, 108 about the corresponding axis and transmits a signal to an electronic data processing system within the AACMM 100 as described in more detail herein below. Each individual raw encoder count is sent separately to the electronic data processing system as a signal where it is further processed into measurement data. No position calculator separate from the AACMM 100 itself (e.g., a serial box) is required, as disclosed in commonly assigned U.S. Pat. No. 5,402,582 ('582).

The base 116 may include an attachment device or mounting device 120. The mounting device 120 allows the AACMM 100 to be removably mounted to a desired location, such as an inspection table, a machining center, a wall or the floor for example. In one embodiment, the base 116 includes a handle portion 122 that provides a convenient location for the operator to hold the base 116 as the AACMM 100 is being moved. In one embodiment, the base 116 further includes a movable cover portion 124 that folds down to reveal a user interface, such as a display screen.

In accordance with an embodiment, the base 116 of the portable AACMM 100 contains or houses an electronic data processing system that includes two primary components: a base processing system that processes the data from the various encoder systems within the AACMM 100 as well as data representing other arm parameters to support three-dimensional (3-D) positional calculations; and a user interface processing system that includes an on-board operating system, a touch screen display, and resident application software that allows for relatively complete metrology functions to be implemented within the AACMM 100 without the need for connection to an external computer.

The electronic data processing system in the base 116 may communicate with the encoder systems, sensors, and other peripheral hardware located away from the base 116 (e.g., a LLP that can be mounted to the removable handle 126 on the AACMM 100). The electronics that support these peripheral hardware devices or features may be located in each of the bearing cartridge groupings 110, 112, 114 located within the portable AACMM 100.

Figure 2A:
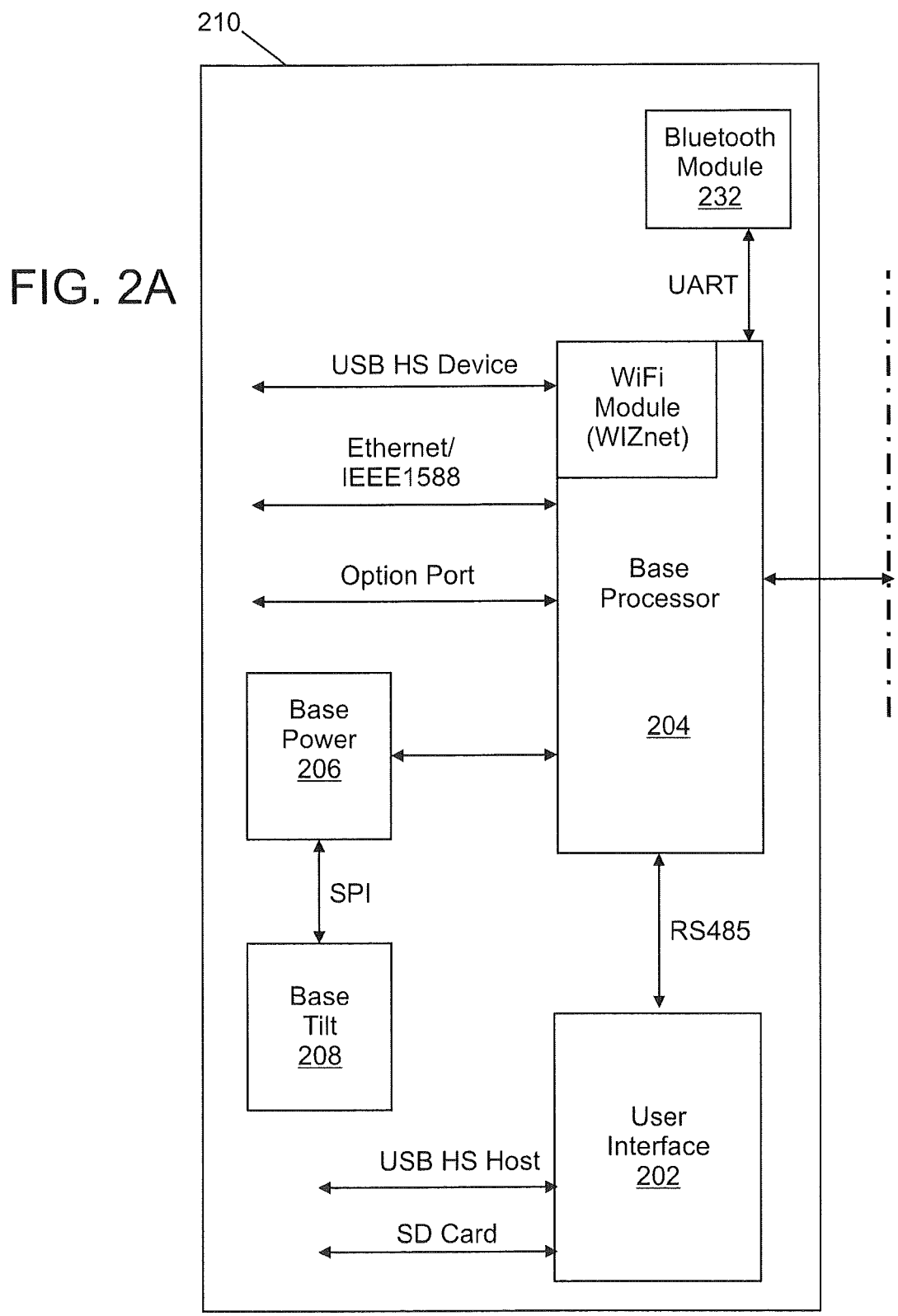
FIG. 2, including FIGS. 2A-2D taken together, is a block diagram of electronics utilized as part of the AACMM of FIG. 1 in accordance with an embodiment.
Figure 2B:
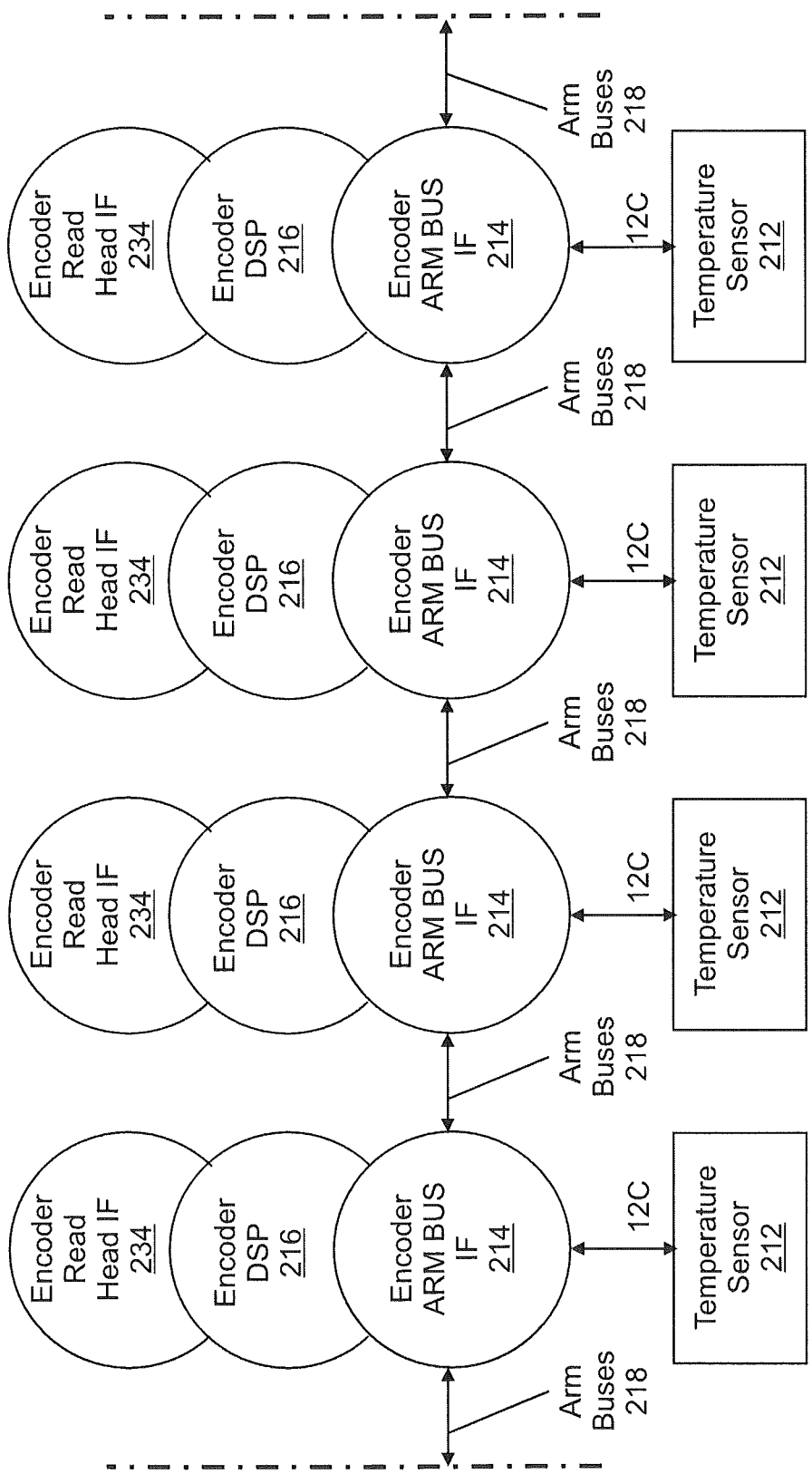
Figure 2C:
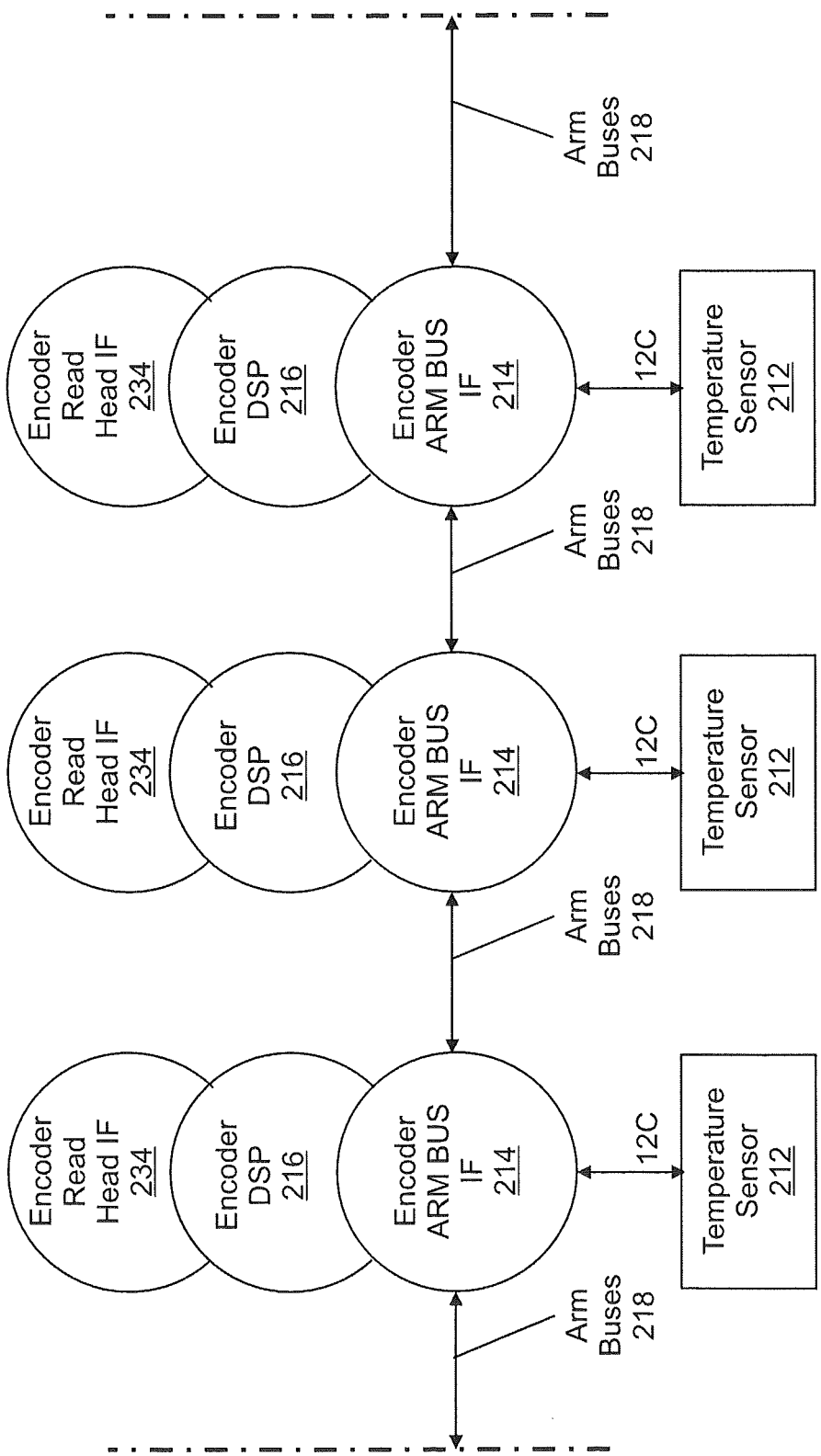
Figure 2D:
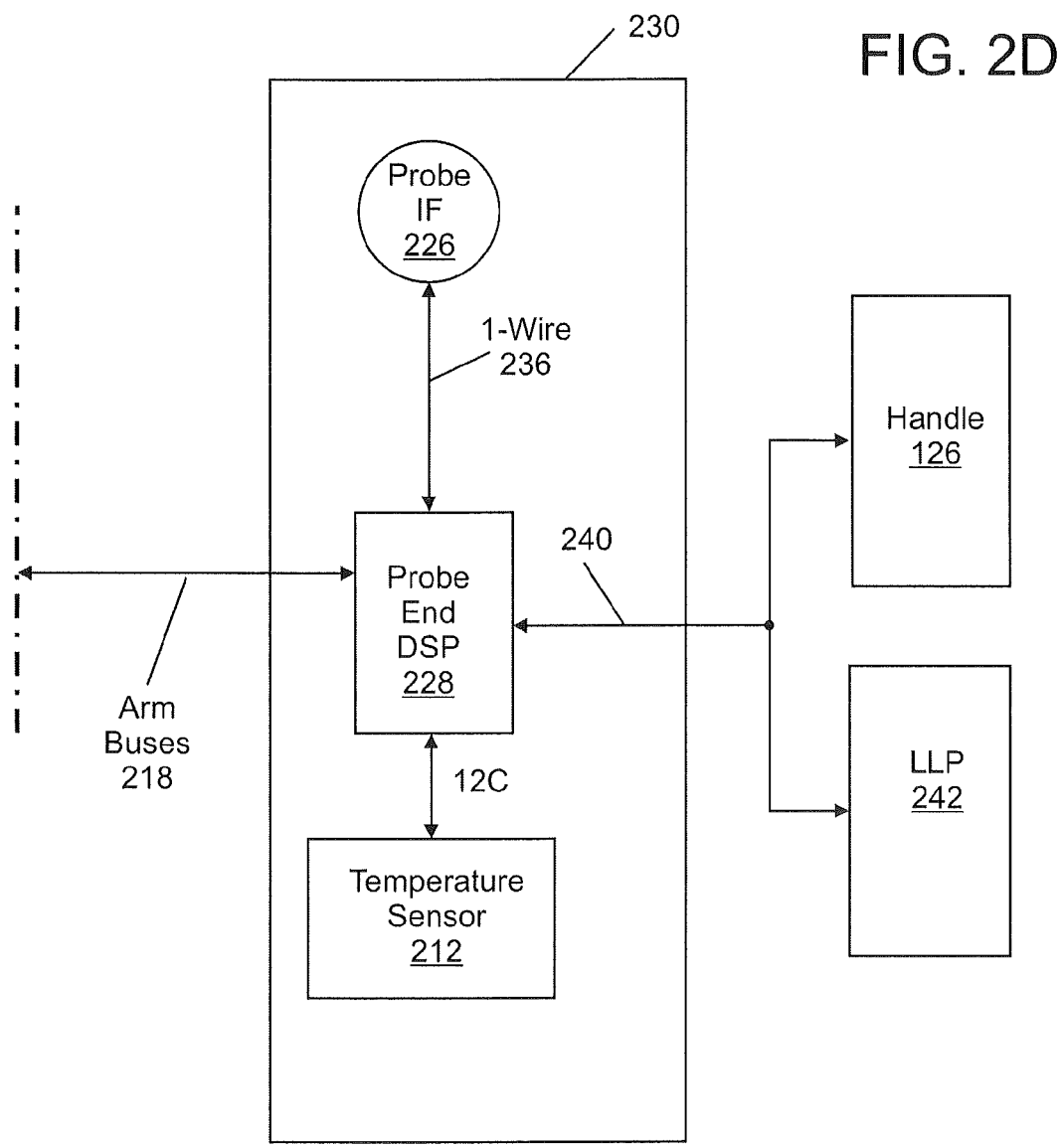
Figure 2:
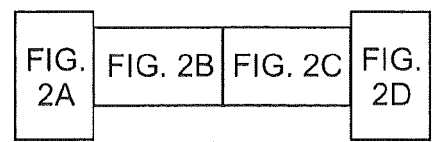

FIG. 2 is a block diagram of electronics utilized in an AACMM 100 in accordance with an embodiment. The embodiment shown in FIG. 2 includes an electronic data processing system 210 including a base processor board 204 for implementing the base processing system, a user interface board 202, a base power board 206 for providing power, a Bluetooth module 232, and a base tilt board 208. The user interface board 202 includes a computer processor for executing application software to perform user interface, display, and other functions described herein.

As shown in FIG. 2, the electronic data processing system 210 is in communication with the aforementioned plurality of encoder systems via one or more arm buses 218. In the embodiment depicted in FIG. 2, each encoder system generates encoder data and includes: an encoder arm bus interface 214, an encoder digital signal processor (DSP) 216, an encoder read head interface 234, and a temperature sensor 212. Other devices, such as strain sensors, may be attached to the arm bus 218.

Also shown in FIG. 2 are probe end electronics 230 that are in communication with the arm bus 218. The probe end electronics 230 include a probe end DSP 228, a temperature sensor 212, a handle/LLP interface bus 240 that connects with the handle 126 or the LLP 242 via the quick-connect interface in an embodiment, and a probe interface 226. The quick-connect interface allows access by the handle 126 to the data bus, control lines, and power bus used by the LLP 242 and other accessories. In an embodiment, the probe end electronics 230 are located in the measurement probe housing 102 on the AACMM 100. In an embodiment, the handle 126 may be removed from the quick-connect interface and measurement may be performed by the laser line probe (LLP) 242 communicating with the probe end electronics 230 of the AACMM 100 via the handle/LLP interface bus 240. In an embodiment, the electronic data processing system 210 is located in the base 116 of the AACMM 100, the probe end electronics 230 are located in the measurement probe housing 102 of the AACMM 100, and the encoder systems are located in the bearing cartridge groupings 110, 112, 114. The probe interface 226 may connect with the probe end DSP 228 by any suitable communications protocol, including commercially-available products from Maxim Integrated Products, Inc. that embody the 1-Wire® communications protocol 236.

Figure 3A:
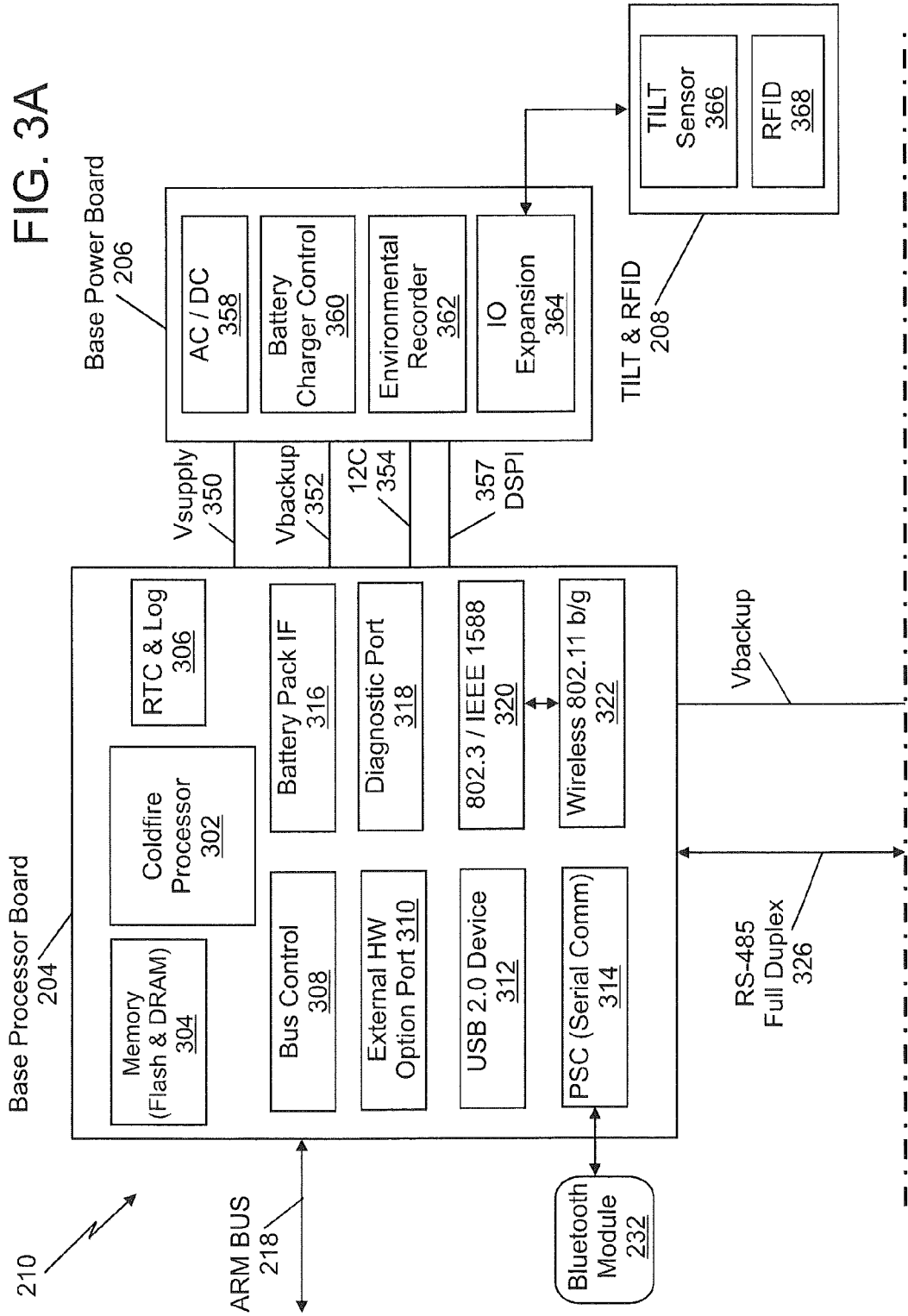
FIG. 3, including FIGS. 3A and 3B taken together, is a block diagram describing detailed features of the electronic data processing system of FIG. 2 in accordance with an embodiment.
Figures 3, 3B:
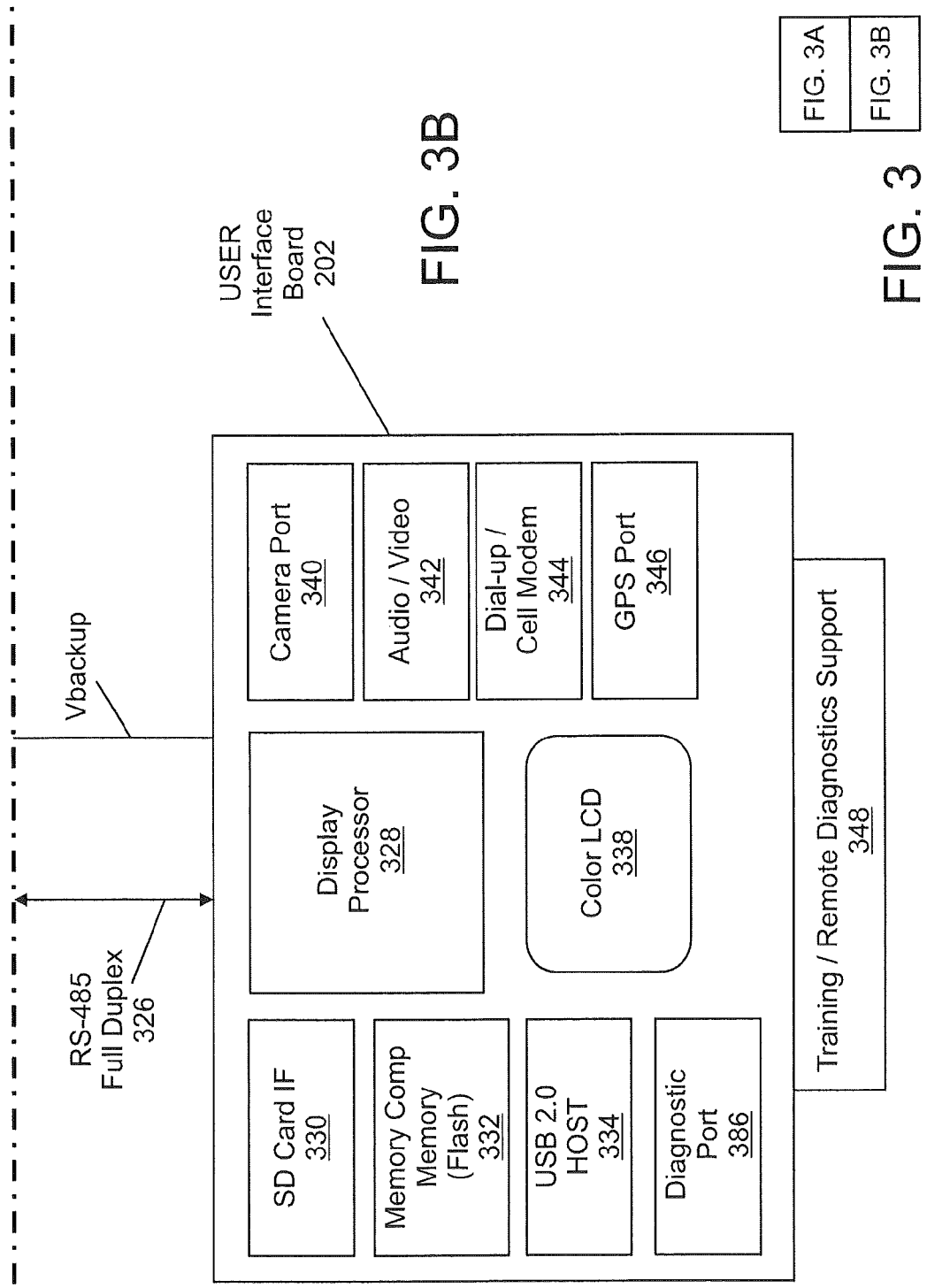
Figure 4:
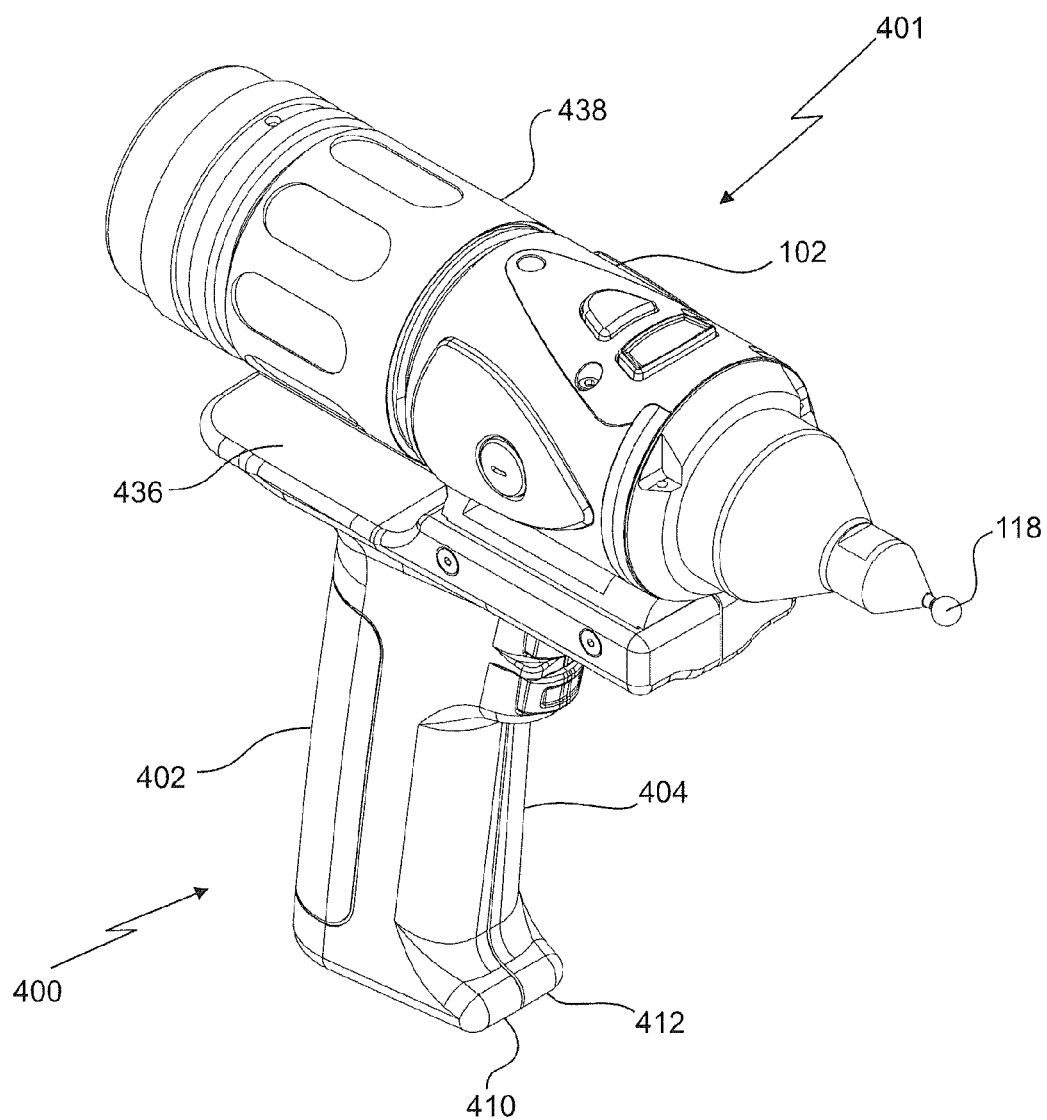
FIG. 4 is an isometric view of the probe end of the AACMM of FIG. 1.

FIG. 3 is a block diagram describing detailed features of the electronic data processing system 210 of the AACMM 100 in accordance with an embodiment. In an embodiment, the electronic data processing system 210 is located in the base 116 of the AACMM 100 and includes the base processor board 204, the user interface board 202, a base power board 206, a Bluetooth module 232, and a base tilt module 208.

In an embodiment shown in FIG. 3, the base processor board 204 includes the various functional blocks illustrated therein. For example, a base processor function 302 is utilized to support the collection of measurement data from the AACMM 100 and receives raw arm data (e.g., encoder system data) via the arm bus 218 and a bus control module function 308. The memory function 304 stores programs and static arm configuration data. The base processor board 204 also includes an external hardware option port function 310 for communicating with any external hardware devices or accessories such as an LLP 242. A real time clock (RTC) and log 306, a battery pack interface (IF) 316, and a diagnostic port 318 are also included in the functionality in an embodiment of the base processor board 204 depicted in FIG. 3.

The base processor board 204 also manages all the wired and wireless data communication with external (host computer) and internal (display processor 202) devices. The base processor board 204 has the capability of communicating with an Ethernet network via an Ethernet function 320 (e.g., using a clock synchronization standard such as Institute of Electrical and Electronics Engineers (IEEE) 1588), with a wireless local area network (WLAN) via a LAN function 322, and with Bluetooth module 232 via a parallel to serial communications (PSC) function 314. The base processor board 204 also includes a connection to a universal serial bus (USB) device 312.

The base processor board 204 transmits and collects raw measurement data (e.g., encoder system counts, temperature readings) for processing into measurement data without the need for any preprocessing, such as disclosed in the serial box of the aforementioned '582 patent. The base processor 204 sends the processed data to the display processor 328 on the user interface board 202 via an RS485 interface (IF) 326. In an embodiment, the base processor 204 also sends the raw measurement data to an external computer.

Turning now to the user interface board 202 in FIG. 3, the angle and positional data received by the base processor is utilized by applications executing on the display processor 328 to provide an autonomous metrology system within the AACMM 100. Applications may be executed on the display processor 328 to support functions such as, but not limited to: measurement of features, guidance and training graphics, remote diagnostics, temperature corrections, control of various operational features, connection to various networks, and display of measured objects. Along with the display processor 328 and a liquid crystal display (LCD) 338 (e.g., a touch screen LCD) user interface, the user interface board 202 includes several interface options including a secure digital (SD) card interface 330, a memory 332, a USB Host interface 334, a diagnostic port 336, a camera port 340, an audio/video interface 342, a dial-up/cell modem 344 and a global positioning system (GPS) port 346.

The electronic data processing system 210 shown in FIG. 3 also includes a base power board 206 with an environmental recorder 362 for recording environmental data. The base power board 206 also provides power to the electronic data processing system 210 using an AC/DC converter 358 and a battery charger control 360. The base power board 206 communicates with the base processor board 204 using inter-integrated circuit (I2C) serial single ended bus 354 as well as via a DMA serial peripheral interface (DSPI) 356. The base power board 206 is connected to a tilt sensor and radio frequency identification (RFID) module 208 via an input/output (I/O) expansion function 364 implemented in the base power board 206.

Though shown as separate components, in other embodiments all or a subset of the components may be physically located in different locations and/or functions combined in different manners than that shown in FIG. 3. For example, in one embodiment, the base processor board 204 and the user interface board 202 are combined into one physical board.

Figure 7:
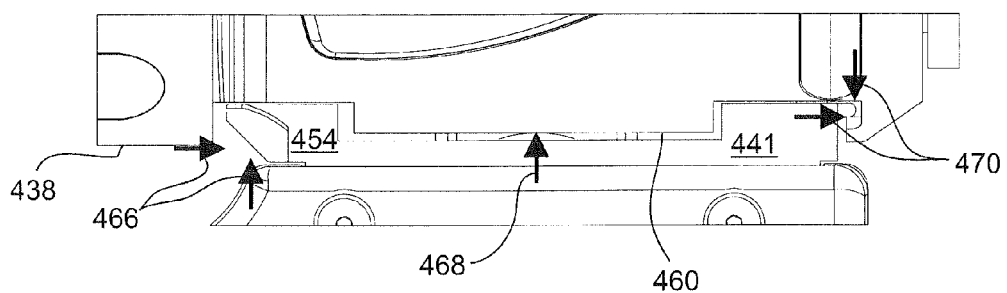
FIG. 7 is an enlarged partial side view of the interface portion of the probe end of FIG. 6.
Figure 8:
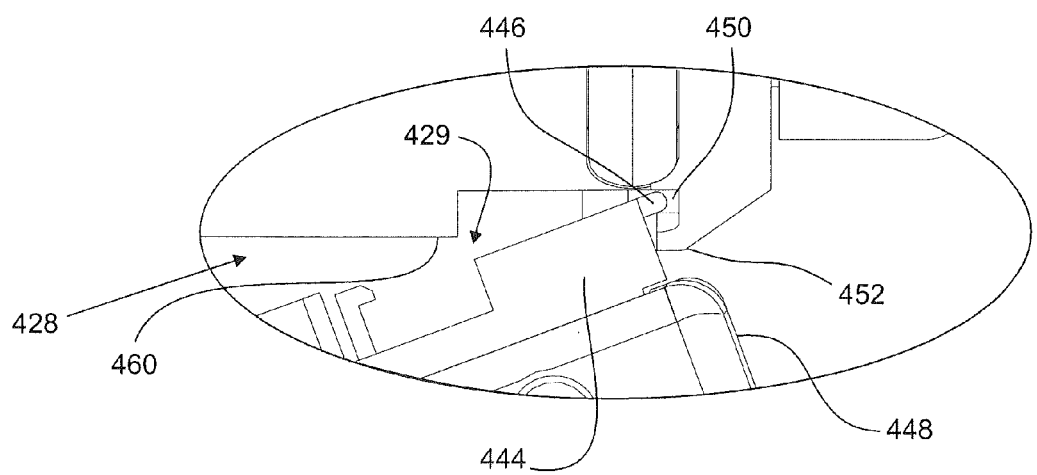
FIG. 8 is another enlarged partial side view of the interface portion of the probe end of FIG. 5.
Figure 9:
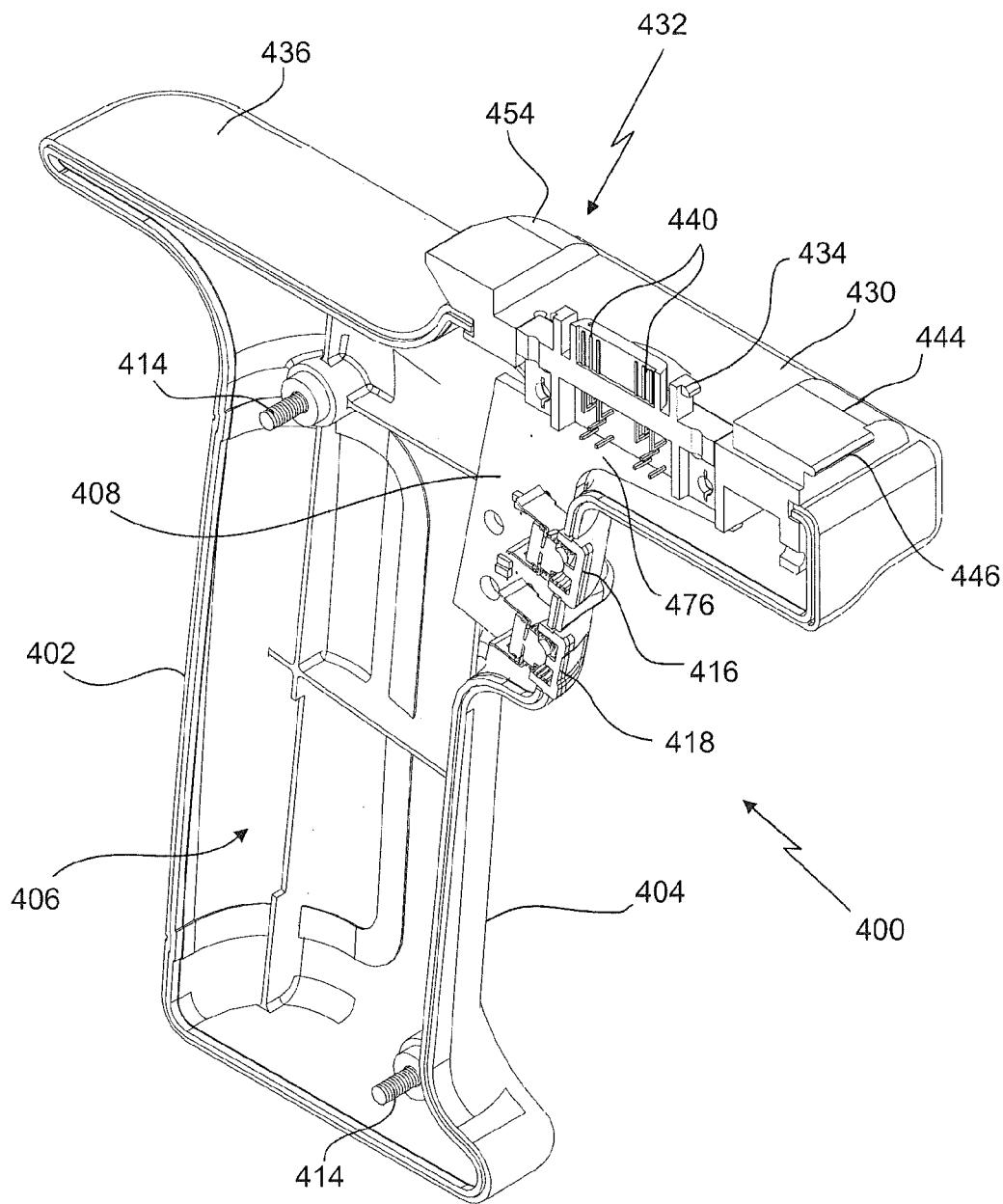
FIG. 9 is an isometric view partially in section of the handle of FIG. 4.

Referring now to FIGS. 4-9, an exemplary embodiment of a probe end 401 is illustrated having a measurement probe housing 102 with a quick-connect mechanical and electrical interface that allows removable and interchangeable device 400 to couple with AACMM 100. In the exemplary embodiment, the device 400 includes an enclosure 402 that includes a handle portion 404 that is sized and shaped to be held in an operator's hand, such as in a pistol grip for example. The enclosure 402 is a thin wall structure having a cavity 406 (FIG. 9). The cavity 406 is sized and configured to receive a controller 408. The controller 408 may be a digital circuit, having a microprocessor for example, or an analog circuit. In one embodiment, the controller 408 is in asynchronous bidirectional communication with the electronic data processing system 210 (FIGS. 2 and 3). The communication connection between the controller 408 and the electronic data processing system 210 may be wired (e.g. via controller 420) or may be a direct or indirect wireless connection (e.g. Bluetooth or IEEE 802.11) or a combination of wired and wireless connections. In the exemplary embodiment, the enclosure 402 is formed in two halves 410, 412, such as from an injection molded plastic material for example. The halves 410, 412 may be secured together by fasteners, such as screws 414 for example. In other embodiments, the enclosure halves 410, 412 may be secured together by adhesives or ultrasonic welding for example.

The handle portion 404 also includes buttons or actuators 416, 418 that may be manually activated by the operator. The actuators 416, 418 are coupled to the controller 408 that transmits a signal to a controller 420 within the probe housing 102. In the exemplary embodiments, the actuators 416, 418 perform the functions of actuators 422, 424 located on the probe housing 102 opposite the device 400. It should be appreciated that the device 400 may have additional switches, buttons or other actuators that may also be used to control the device 400, the AACMM 100 or vice versa. Also, the device 400 may include indicators, such as light emitting diodes (LEDs), sound generators, meters, displays or gauges for example. In one embodiment, the device 400 may include a digital voice recorder that allows for synchronization of verbal comments with a measured point. In yet another embodiment, the device 400 includes a microphone that allows the operator to transmit voice activated commands to the electronic data processing system 210.

In one embodiment, the handle portion 404 may be configured to be used with either operator hand or for a particular hand (e.g. left handed or right handed). The handle portion 404 may also be configured to facilitate operators with disabilities (e.g. operators with missing fingers or operators with prosthetic arms). Further, the handle portion 404 may be removed and the probe housing 102 used by itself when clearance space is limited. As discussed above, the probe end 401 may also comprise the shaft of the seventh axis of AACMM 100. In this embodiment the device 400 may be arranged to rotate about the AACMM seventh axis.

The probe end 401 includes a mechanical and electrical interface 426 having a first connector 429 (FIG. 8) on the device 400 that cooperates with a second connector 428 on the probe housing 102. The connectors 428, 429 may include electrical and mechanical features that allow for coupling of the device 400 to the probe housing 102. In one embodiment, the interface 426 includes a first surface 430 having a mechanical coupler 432 and an electrical connector 434 thereon. The enclosure 402 also includes a second surface 436 positioned adjacent to and offset from the first surface 430. In the exemplary embodiment, the second surface 436 is a planar surface offset a distance of approximately 0.5 inches from the first surface 430. As will be discussed in more detail below, this offset provides a clearance for the operator's fingers when tightening or loosening a fastener such as collar 438. The interface 426 provides for a relatively quick and secure electronic connection between the device 400 and the probe housing 102 without the need to align connector pins, and without the need for separate cables or connectors.

The electrical connector 434 extends from the first surface 430 and includes one or more connector pins 440 that are electrically coupled in asynchronous bidirectional communication with the electronic data processing system 210 (FIGS. 2 and 3), such as via one or more arm buses 218 for example. The bidirectional communication connection may be wired (e.g. via arm bus 218), wireless (e.g. Bluetooth or IEEE 802.11), or a combination of wired and wireless connections. In one embodiment, the electrical connector 434 is electrically coupled to the controller 420. The controller 420 may be in asynchronous bidirectional communication with the electronic data processing system 210 such as via one or more arm buses 218 for example. The electrical connector 434 is positioned to provide a relatively quick and secure electronic connection with electrical connector 442 on probe housing 102. The electrical connectors 434, 442 connect with each other when the device 400 is attached to the probe housing 102. The electrical connectors 434, 442 may each comprise a metal encased connector housing that provides shielding from electromagnetic interference as well as protecting the connector pins and assisting with pin alignment during the process of attaching the device 400 to the probe housing 102.

The mechanical coupler 432 provides relatively rigid mechanical coupling between the device 400 and the probe housing 102 to support relatively precise applications in which the location of the device 400 on the end of the arm portion 104 of the AACMM 100 preferably does not shift or move. Any such movement may typically cause an undesirable degradation in the accuracy of the measurement result. These desired results are achieved using various structural features of the mechanical attachment configuration portion of the quick connect mechanical and electronic interface of an embodiment of the present invention.

In one embodiment, the mechanical coupler 432 includes a first projection 444 positioned on one end 448 (the leading edge or "front" of the device 400). The first projection 444 may include a keyed, notched or ramped interface that forms a lip 446 that extends from the first projection 444. The lip 446 is sized to be received in a slot 450 defined by a projection 452 extending from the probe housing 102 (FIG. 8). It should be appreciated that the first projection 444 and the slot 450 along with the collar 438 form a coupler arrangement such that when the lip 446 is positioned within the slot 450, the slot 450 may be used to restrict both the longitudinal and lateral movement of the device 400 when attached to the probe housing 102. As will be discussed in more detail below, the rotation of the collar 438 may be used to secure the lip 446 within the slot 450.

Figure 5:
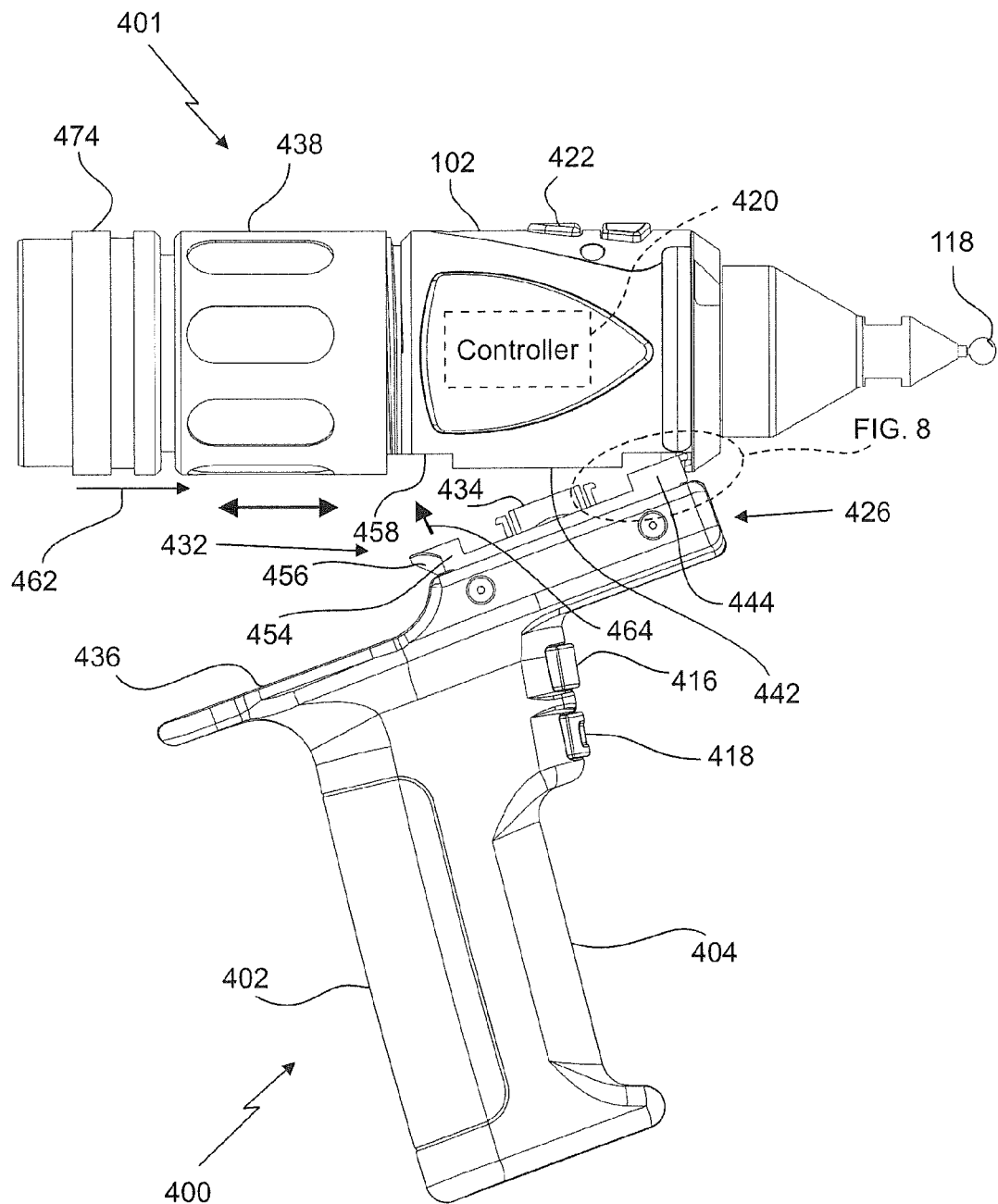
FIG. 5 is a side view of the probe end of FIG. 4 with the handle being coupled thereto.

Opposite the first projection 444, the mechanical coupler 432 may include a second projection 454. The second projection 454 may have a keyed, notched-lip or ramped interface surface 456 (FIG. 5). The second projection 454 is positioned to engage a fastener associated with the probe housing 102, such as collar 438 for example. As will be discussed in more detail below, the mechanical coupler 432 includes a raised surface projecting from surface 430 that adjacent to or disposed about the electrical connector 434 which provides a pivot point for the interface 426 (FIGS. 7 and 8). This serves as the third of three points of mechanical contact between the device 400 and the probe housing 102 when the device 400 is attached thereto.

The probe housing 102 includes a collar 438 arranged co-axially on one end. The collar 438 includes a threaded portion that is movable between a first position (FIG. 5) and a second position (FIG. 7). By rotating the collar 438, the collar 438 may be used to secure or remove the device 400 without the need for external tools. Rotation of the collar 438 moves the collar 438 along a relatively coarse, square-threaded cylinder 474. The use of such relatively large size, square-thread and contoured surfaces allows for significant clamping force with minimal rotational torque. The coarse pitch of the threads of the cylinder 474 further allows the collar 438 to be tightened or loosened with minimal rotation.

Figure 6:
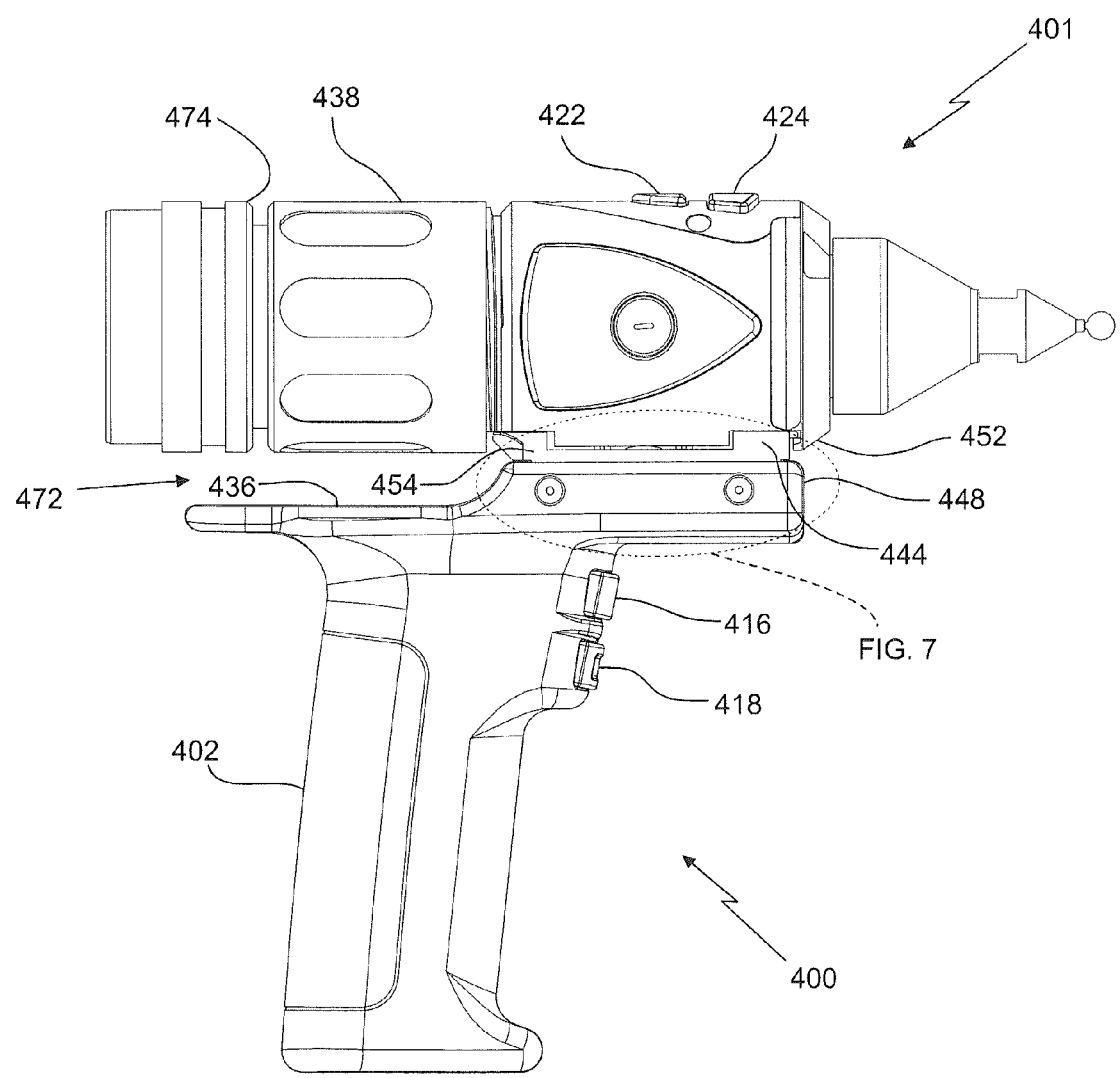
FIG. 6 is a partial side view of the probe end of FIG. 4 with the handle attached.

To couple the device 400 to the probe housing 102, the lip 446 is inserted into the slot 450 and the device is pivoted to rotate the second projection 454 toward surface 458 as indicated by arrow 464 (FIG. 5). The collar 438 is rotated causing the collar 438 to move or translate in the direction indicated by arrow 462 into engagement with surface 456. The movement of the collar 438 against the angled surface 456 drives the mechanical coupler 432 against the raised surface 460. This assists in overcoming potential issues with distortion of the interface or foreign objects on the surface of the interface that could interfere with the rigid seating of the device 400 to the probe housing 102. The application of force by the collar 438 on the second projection 454 causes the mechanical coupler 432 to move forward pressing the lip 446 into a seat on the probe housing 102. As the collar 438 continues to be tightened, the second projection 454 is pressed upward toward the probe housing 102 applying pressure on a pivot point. This provides a see-saw type arrangement, applying pressure to the second projection 454, the lip 446 and the center pivot point to reduce or eliminate shifting or rocking of the device 400. The pivot point presses directly against the bottom on the probe housing 102 while the lip 446 is applies a downward force on the end of probe housing 102. FIG. 5 includes arrows 462, 464 to show the direction of movement of the device 400 and the collar 438. FIG. 7 includes arrows 466, 468, 470 to show the direction of applied pressure within the interface 426 when the collar 438 is tightened. It should be appreciated that the offset distance of the surface 436 of device 400 provides a gap 472 between the collar 438 and the surface 436 (FIG. 6). The gap 472 allows the operator to obtain a firmer grip on the collar 438 while reducing the risk of pinching fingers as the collar 438 is rotated. In one embodiment, the probe housing 102 is of sufficient stiffness to reduce or prevent the distortion when the collar 438 is tightened.

Embodiments of the interface 426 allow for the proper alignment of the mechanical coupler 432 and electrical connector 434 and also protects the electronics interface from applied stresses that may otherwise arise due to the clamping action of the collar 438, the lip 446 and the surface 456. This provides advantages in reducing or eliminating stress damage to circuit board 476 mounted electrical connectors 434, 442 that may have soldered terminals. Also, embodiments provide advantages over known approaches in that no tools are required for a user to connect or disconnect the device 400 from the probe housing 102. This allows the operator to manually connect and disconnect the device 400 from the probe housing 102 with relative ease.

Due to the relatively large number of shielded electrical connections possible with the interface 426, a relatively large number of functions may be shared between the AACMM 100 and the device 400. For example, switches, buttons or other actuators located on the AACMM 100 may be used to control the device 400 or vice versa. Further, commands and data may be transmitted from electronic data processing system 210 to the device 400. In one embodiment, the device 400 is a video camera that transmits data of a recorded image to be stored in memory on the base processor 204 or displayed on the display 328. In another embodiment the device 400 is an image projector that receives data from the electronic data processing system 210. In addition, temperature sensors located in either the AACMM 100 or the device 400 may be shared by the other. It should be appreciated that embodiments of the present invention provide advantages in providing a flexible interface that allows a wide variety of accessory devices 400 to be quickly, easily and reliably coupled to the AACMM 100. Further, the capability of sharing functions between the AACMM 100 and the device 400 may allow a reduction in size, power consumption and complexity of the AACMM 100 by eliminating duplicity.

In one embodiment, the controller 408 may alter the operation or functionality of the probe end 401 of the AACMM 100. For example, the controller 408 may alter indicator lights on the probe housing 102 to either emit a different color light, a different intensity of light, or turn on/off at different times when the device 400 is attached versus when the probe housing 102 is used by itself. In one embodiment, the device 400 includes a range finding sensor (not shown) that measures the distance to an object. In this embodiment, the controller 408 may change indicator lights on the probe housing 102 in order to provide an indication to the operator how far away the object is from the probe tip 118. This provides advantages in simplifying the requirements of controller 420 and allows for upgraded or increased functionality through the addition of accessory devices.

Figure 10:
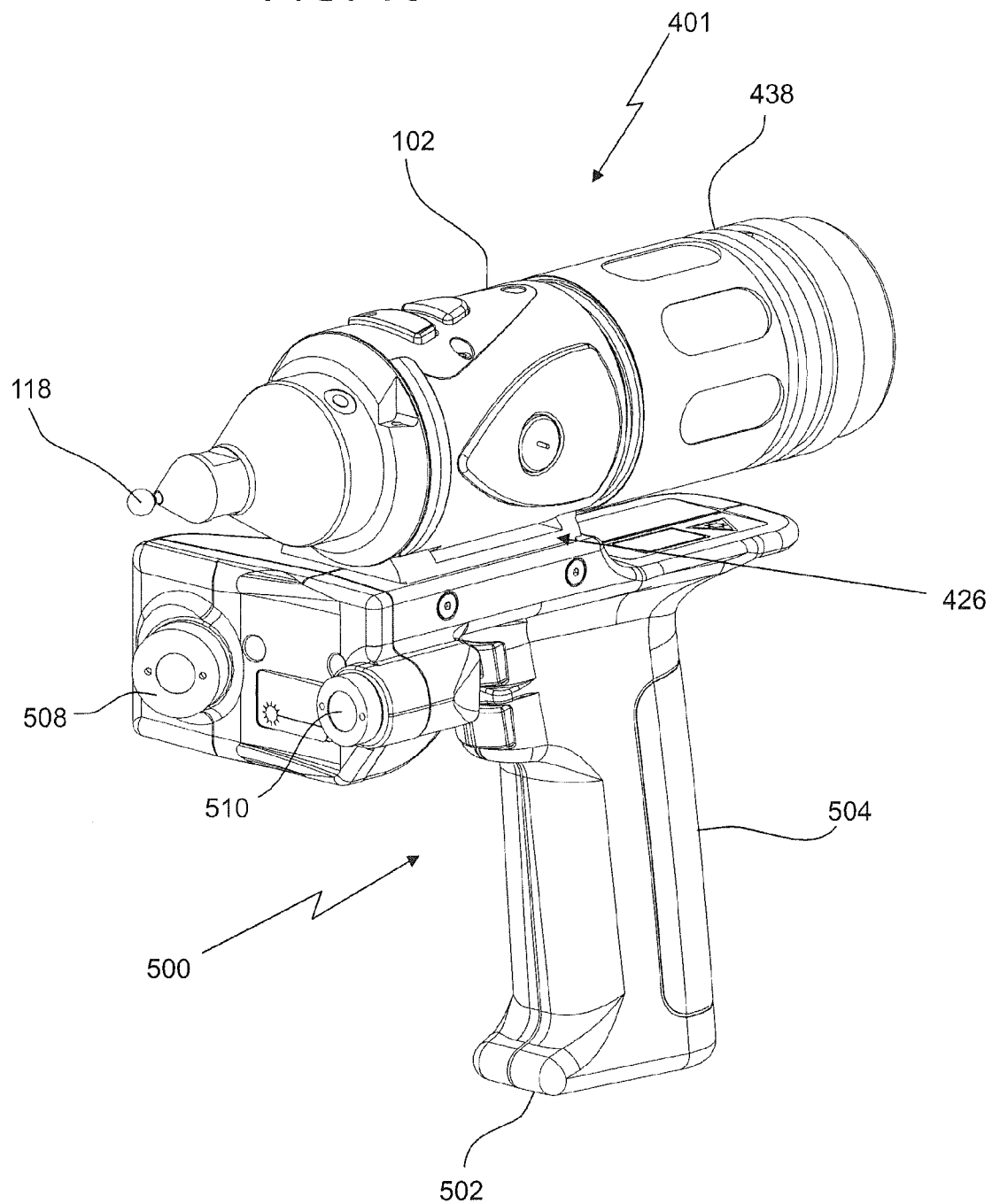
FIG. 10 is an isometric view of the probe end of the AACMM of FIG. 1 with a laser line probe device attached.
Figure 11:
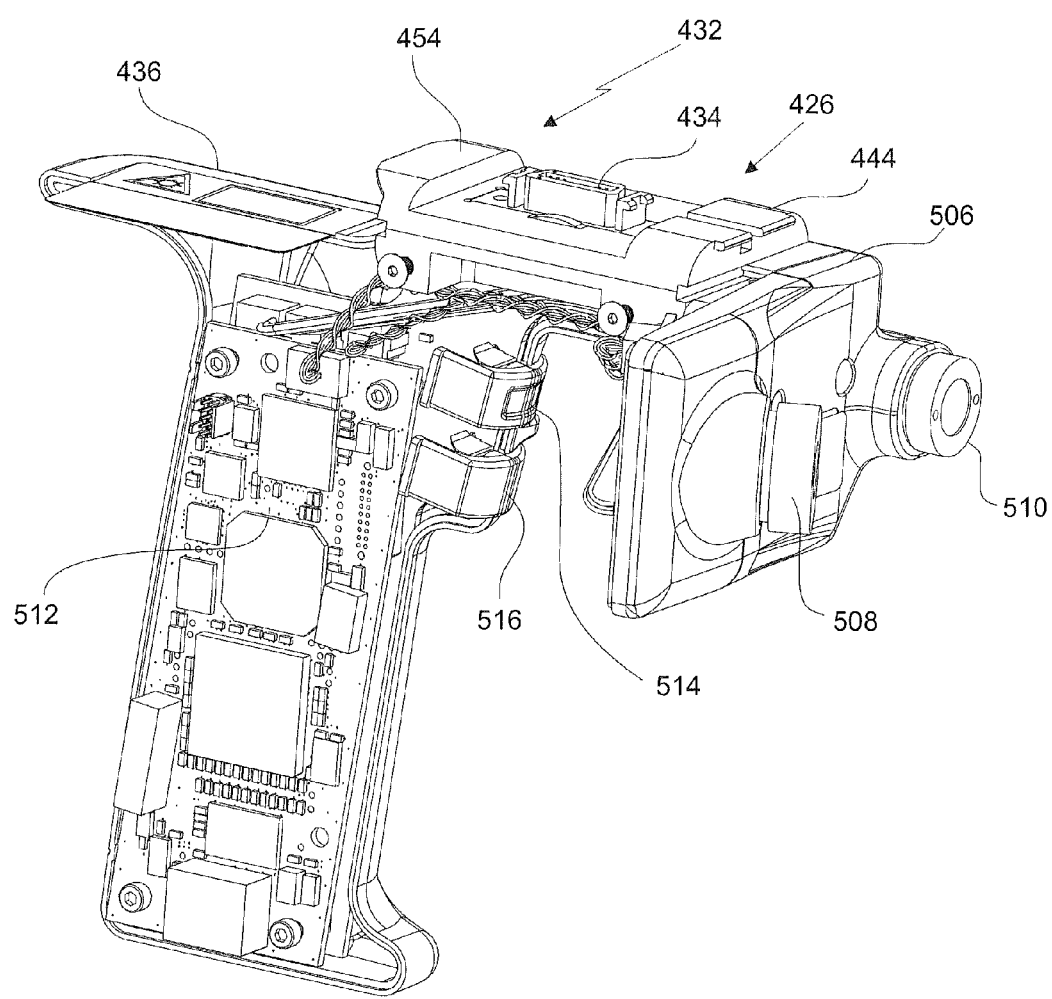
FIG. 11 is an isometric view partially in section of the laser line probe of FIG. 10.

Referring to FIGS. 10-11, embodiments of the present invention provide advantages to camera, signal processing, control and indicator interfaces for a laser line probe (LLP) scanning device 500. The LLP 500 includes an enclosure 502 with a handle portion 504. The LLP 500 further includes an interface 426 on one end that mechanically and electrically couples the LLP 500 to the probe housing 102 as described herein above. The interface 426 allows the LLP 500 to be coupled and removed from the AACMM 100 quickly and easily without requiring additional tools. Adjacent the interface 426, the enclosure 502 includes a portion 506 that includes an optical device 510, such as a laser device for example, and a sensor 508. The sensor 508 may be charged-coupled device (CCD) type sensor or a complementary metal-oxide-semiconductor (CMOS) type sensor for example. In the exemplary embodiment, the optical device 510 and sensor 508 are arranged at an angle such that the sensor 508 may detect reflected light from the optical device 510 at a desired focal point. In one embodiment, the focal point of the optical device 510 and the sensor 508 is offset from the probe tip 118 such that the LLP 500 may be operated without interference from the probe tip 118. In other words, the LLP 500 may be operated with the probe tip 118 in place. Further, it should be appreciated that the LLP 500 is substantially fixed relative to the probe tip 118 and forces on the handle portion 504 may not influence the alignment of the LLP 500 relative to the probe tip 118. In one embodiment, the LLP 500 may have an additional actuator (not shown) that allows the operator to switch between acquiring data from the LLP 500 and the probe tip 118.

The optical device 510 and sensor 508 are electrically coupled to a controller 512 disposed within the enclosure 502. The controller 512 may include one or more microprocessors, digital signal processors, memory and signal conditioning circuits. Due to the digital signal processing and large data volume generated by the LLP 500, the controller 512 may be arranged within the handle portion 504. The controller 512 is electrically coupled to the arm buses 218 via electrical connector 434. The LLP 500 further includes actuators 514, 516 which may be manually activated by the operator to initiate operation and data capture by the LLP 500.

Figure 12:
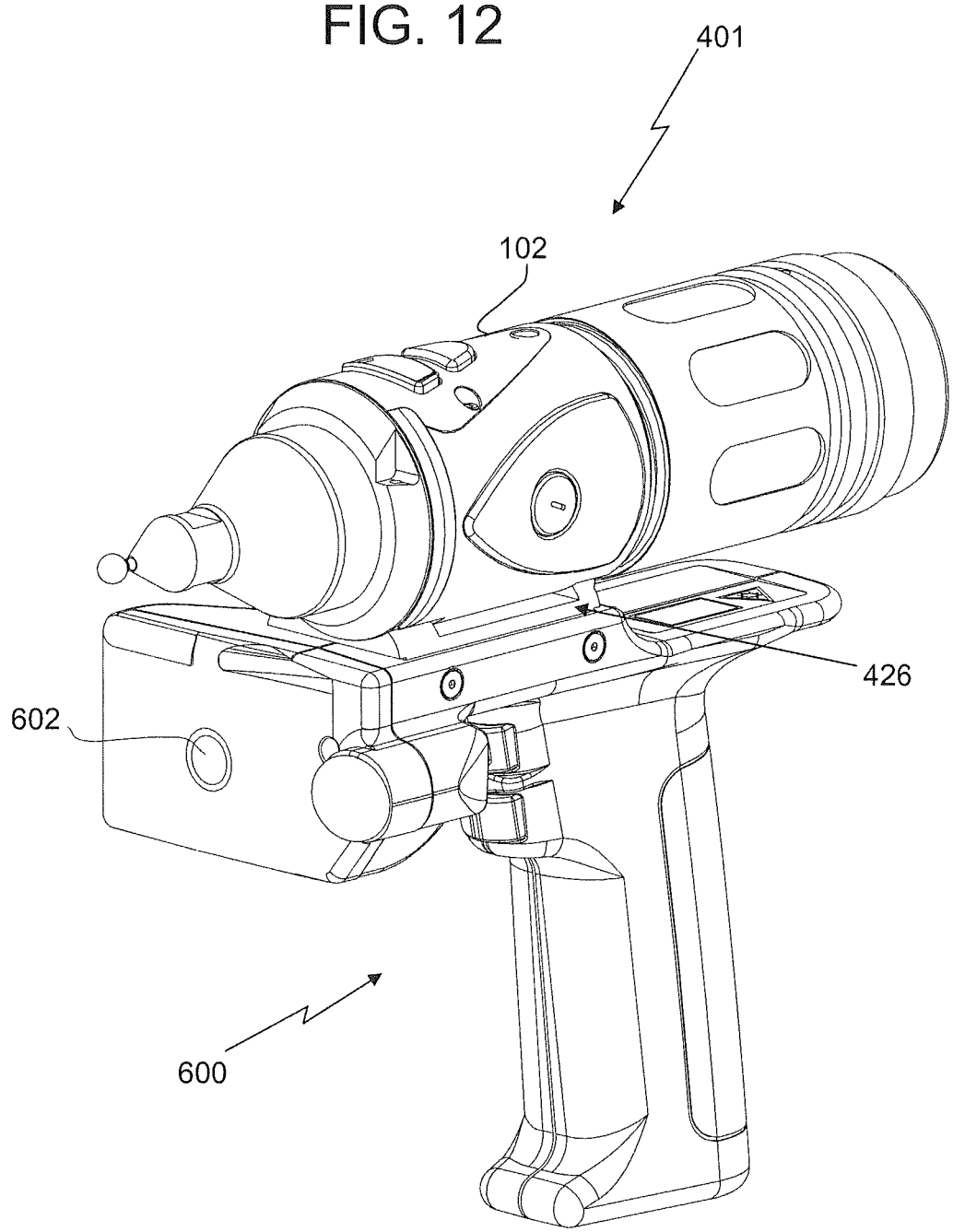
FIG. 12 is an isometric view of the probe end of the AACMM of FIG. 1 with another removable device attached.

In other embodiments of the present invention, the device 600 (FIG. 12) coupled to the AACMM 100 may include a functional device 602. Depending on the type of device 600, the functional device 602 may be a still camera, a video camera, a bar-code scanner, thermal scanner, a light source (e.g. a flashlight), or an image projector. In one embodiment, the functional device 602 may include a retroreflector holder such as that described in commonly-assigned U.S. Pat. No. 7,804,602 entitled "Apparatus and Method for Relocating an Articulating-Arm Coordinate Measuring Machine" which is incorporated herein in its entirety. In yet another embodiment, the functional device 602 may include an ultrasonic probe such as that described in commonly-owned U.S. Pat. No. 5,412,880 entitled "Method of Constructing a 3-Dimensional Map of a Measurable Quantity Using Three Dimensional Coordinate Measuring Apparatus" which is incorporated by reference herein in its entirety. The device 600 includes an interface 426 allowing a device to be electrically and mechanically coupled to the probe housing 102. Device 600 further includes a controller electrically connected to the functional device 602. The controller is arranged in asynchronous bidirectional communication with the electronic data processing system 210. The bidirectional communication connection may be wired (e.g. via arm bus 218), wireless (e.g. Bluetooth or IEEE 802.11). In one embodiment, the communications connection is a combination of wired and wireless connections wherein a first signal type is transmitted via a wired connection via controller 420 and a second signal type is transmitted via a wireless connection. In an embodiment wherein the functional device 602 includes multiple functions such as an image projector and a laser line probe, The image (e.g. CAD) data may be sent via a wireless connection to the image projector while the data acquired by the LLP image sensor is sent via a wired connection. It should be appreciated that the integration of these devices may provide advantages in allowing the operator to acquire measurements faster and with a higher degree of reliability. For example, with the still camera or video camera device attached, the operator may record an image or images of the object being measured with the device. These images may be displayed on display 328 or incorporated into an inspection report for example. In one embodiment, the operator may place graphical markers on the displayed image to define measurement points via the user interface board 202. In this way, the operator can later recall the marked up image from memory and quickly see where to make measurements. In other embodiments, a video is captured of the object being measured. The video is then replayed via the user interface board 202 to assist the operator in repeating multiple measurements on the next object to be inspected or as a training tool for new operators.

Figure 13:
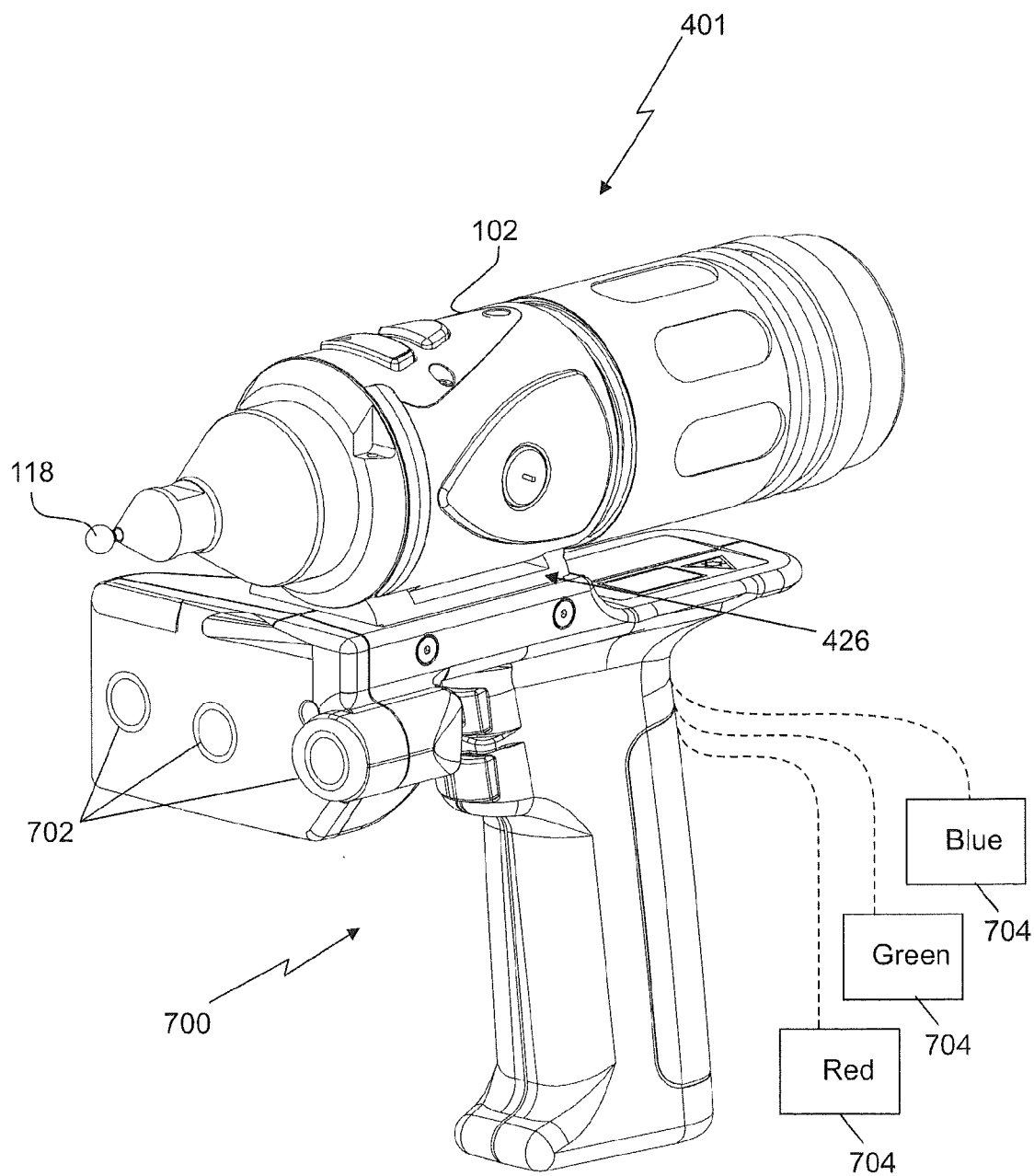
FIG. 13 is an isometric view of the probe end of the AACMM of FIG. 1 with a paint spray device attached.
Figure 14A:
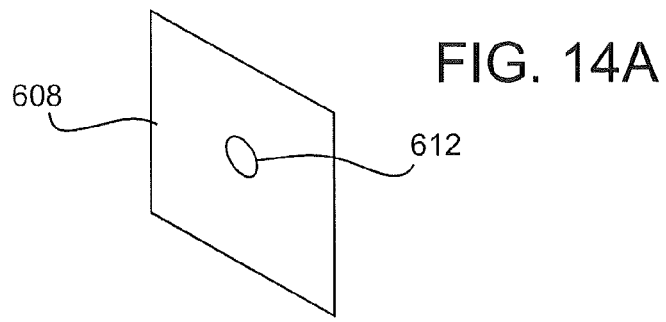
FIG. 14A-FIG. 14C are views of a projected image that is may be adjusted to remain aligned with a part feature as a function of the arm position and orientation, in accordance with an embodiment of the present invention.
Figure 14B:
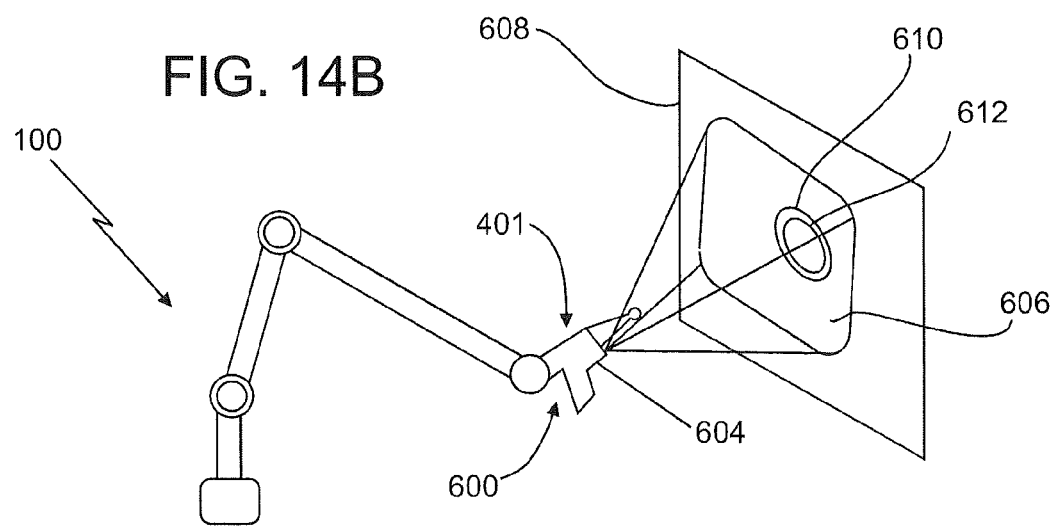
Figure 14C:
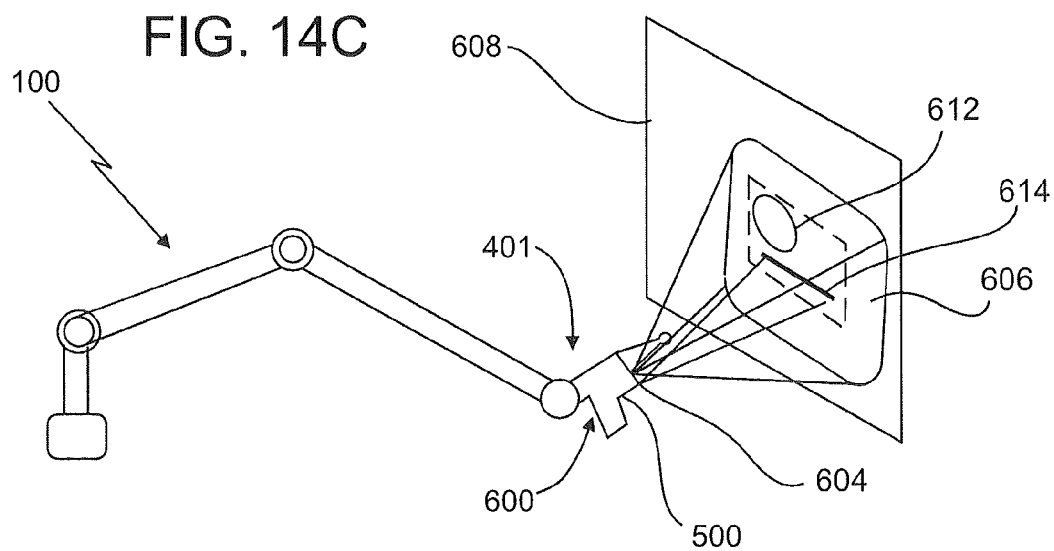

In yet another embodiment, the device may be a paint spray device 700 (FIG. 13). The paint spray device 700 includes an interface 426 that electrically and mechanically couples the paint spray device 700 to the probe housing 102. In this embodiment, the device 700 includes a controller arranged in communication with electronic data processing system 210. The communication connection may be wired (e.g. via arm bus 218), wireless (e.g. Bluetooth or IEEE 802.11), or a combination of wired and wireless connections. The device 700 controller receives a signal from the electronic data processing system 210 and selectively sprays one or more colors from one or more spray nozzles 702 that are each connected to a reservoir 704 (e.g. red, green, blue) each with a single color of paint. It should be appreciated that the spray nozzles 702 may also be an inkjet type of spray mechanism that deposits droplets of paint, ink, pigments or dies onto a surface. The inkjet nozzles may include but are not limited to continuous inkjets, thermal inkjets, and piezoelectric inkjets Since the electronic data processing system 210 knows the position and orientation of the probe housing 102, the device may receive commands to spray a particular color at a particular location to match a desired image stored in memory. Thus, an image or picture may be reproduced by the device 700 as the operator moves the device 700 across the desired surface (e.g. a wall). This embodiment may also provide advantages in manufacturing environments to create layout markings on an article, such as sheet metal for example.

It should be appreciated that while FIG. 13 illustrates the reservoirs 704 as being external to the AACMM 100, this is for exemplary purposes and the claimed invention should not be so limited. In one embodiment, the reservoirs 704 are disposed in the handle of the device 700. In another embodiment, the reservoirs 704 are arranged in the base 116 and conduits extend through the arm 104 providing a system with no external wiring, tubes or conduits.

Referring now to FIG. 12 and FIG. 14-18, an embodiment is shown of a device 600 incorporating one or more image projectors 602. In accordance with embodiments of the present invention, one or more relatively small, commercially available projectors (e.g., "ultra miniature" or "pico" projectors) 604 may be mounted to, connected with, or otherwise attached to the probe end 401 of AACMM 100 or at other various positions thereon (e.g. opposite the handle, on an arm segment). In FIG. 14A-14D, the projector 604 is shown mounted to the device 600 adjacent to the handle 126. However, the projector 604 may be mounted anywhere on the AACMM 100, and may be mounted to a laser line probe, if utilized in conjunction with the AACMM 100. The projector 604 may contain some amount of processing capability. In an embodiment, the projector 604 is connected with, or in communication with, the electronic data processing system 210. As such, the projector 604 may be provided with visual guidance information or data (e.g., an image 606) that the projector 604 then projects onto the part or object 608 to be measured or otherwise worked on by an operator of the AACMM 100, as shown in "Position 1" of FIG. 14B.

Once the orientation of the part 608 is aligned within the coordinate system of the AACMM 100, the scale of the projected image 606 and its perspective can be synchronized to the movement of the AACMM 100 using the positional data of the arm 104. The image 606 projected on the part 608 can be adjusted by a processor associated with the projector 604 or via the electronic data processing system 210 as a function of the position of the probe end 401, such that as the device 600 is moved, the image 606 projected on the part 608 is stationary, changing both in scale and orientation to present a stable image to the operator. This can be seen in "Position 2" of FIG. 14C. As an example, a colored (e.g. green) circle 610 could be projected to align with a hole 612 in the part to be measured. As the probe angle or distance relative to the part 608 is changed, the position of the circle 610 in the projected image 606 changes, yet the circle 610 remains "locked" in position over the hole 612, and remains the same size as the hole 612. This is comparable to locking on and tracking a target. An advantage of this configuration is that the operator does not need to look away from the part 608 at a computer screen, user interface or other visual display as the operator moves the AACMM 100.

Using projected imagery on the part 608 as opposed to simple grid lines in the prior art provides a wide range of projected information options, including but not limited to: (1) Color control—a red circle may change to green after completing a measurement successfully. The color of the marker or graphics may change to provide the highest visibility (contrast) for the color of the part 608. (2) Animations—markers, arrows, or other indicators may flash, changing frequency, alternately changing colors to start or finish an operation. (3) Text—messages, data, or dimensions can be projected on the part. A digital read-out normally displayed on the computer screen can be projected on the part 608. (4) CAD images—can be overlaid on parts, with notes, dimensions or other information. Features to be measured can be sequentially highlighted with color or animation. (5) Photographs—actual images of the part (as designed) can be projected onto the part to be measured, immediately indicating anything that is different, such as a missing hole or a feature in the wrong location. ("Projection with Guidance"; see FIG. 15A). (6) Range Indicator—for non-contact devices like LLP500, range indicators 614 can be projected onto the part surface 608. These can be animated, colored, and include text and/or data.

Figure 15A:
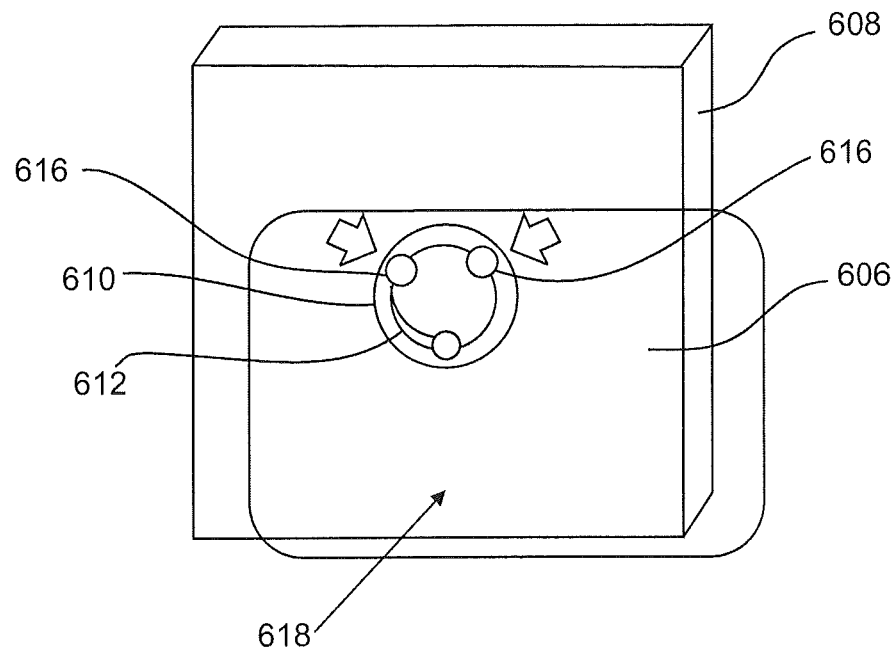
FIG. 15A-15B are views of a surface of a part with an image projected thereon, where the projected image contains probe guidance and status information.
Figure 15B:
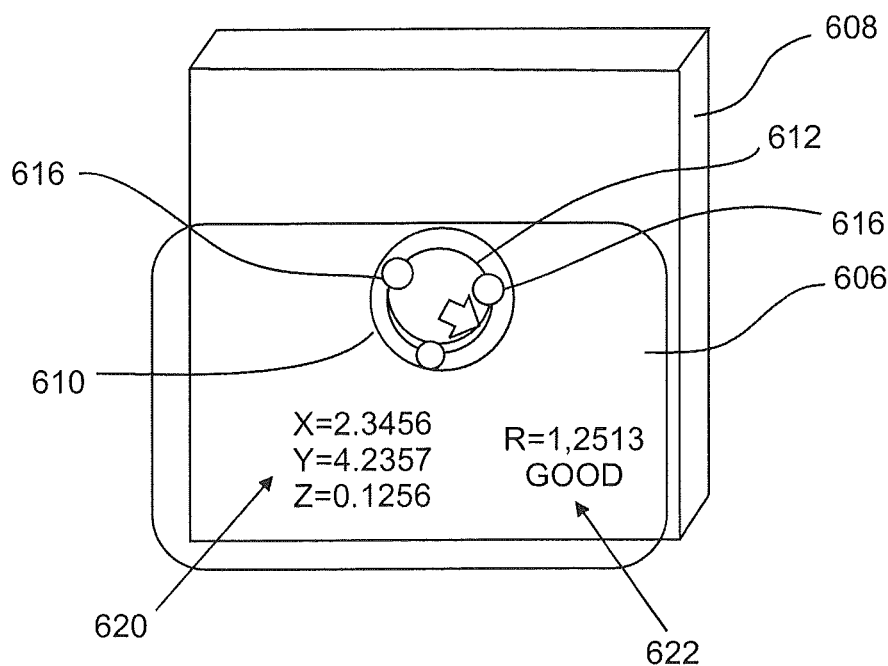

The AACMM 100 may also use the projector 604 to provide guidance to the operator as illustrated in FIG. 15A. The projector 604 generates an image on the part 608 highlighting the feature 612 where the measurements are to be taken with circle 610, while also overlaying indicators 616 where the measurement device 118 should acquire the measurement points. Textual instructions 618 may also be projected and overlaid on the part 608. After taking a measurement of a part or object 608, or a complete set of measurements of the part 608, an indicator 620 of the results can be projected directly onto the part 608 as illustrated in FIG. 15B. This may be used to highlight certain features of the part that are within tolerance and/or outside of tolerance. For a surface scan, high and low points may be color coded and projected directly onto the part 608. For dimensioned feature measurements, a graphical or textual indicator 622 can be projected on the part 608 notifying the operator whether features are in and/or out of tolerance. As discussed above, this provides advantages in decreasing the amount of time needed for inspection of the part 608 since the operator does not need to look away to a computer terminal or user interface.

The projector 604 may also be used to illuminate the working area by projecting white light and the size and shape of the illumination can be controlled. In addition, the area of illumination may be locked while the device 600 is moved because the spotlight location and size can be controlled using the positional data of the probe end 401. If the device 600 is oriented such that the projector 604 cannot illuminate any of the part 608 (e.g., when pointing at the ceiling), then the projector 604 may automatically turn off or go to black.

Figure 16:
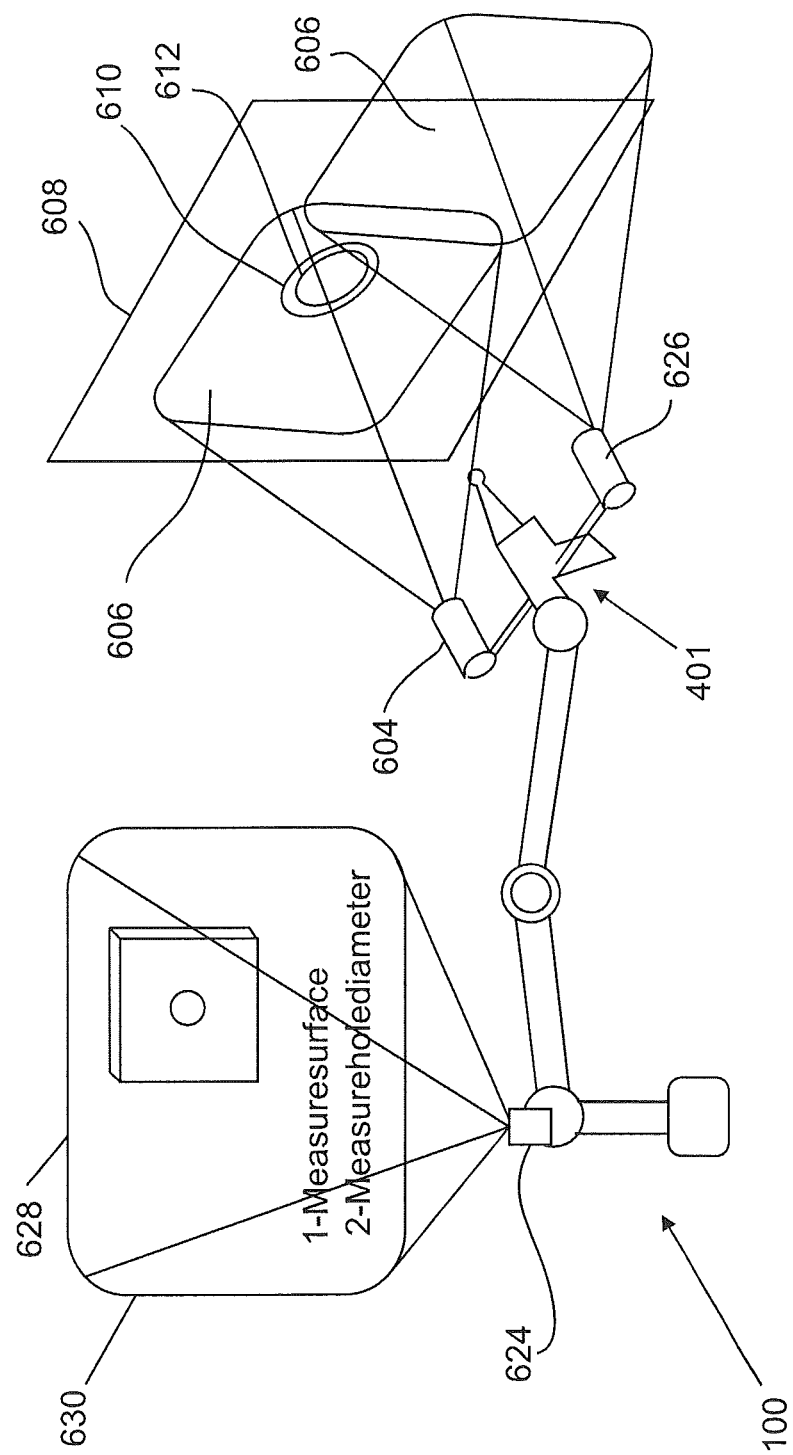
FIG. 16 is a perspective view of an AACMM with two projectors mounted onto a probe end and a third projector mounted on another portion of the AACMM.
Figure 17:
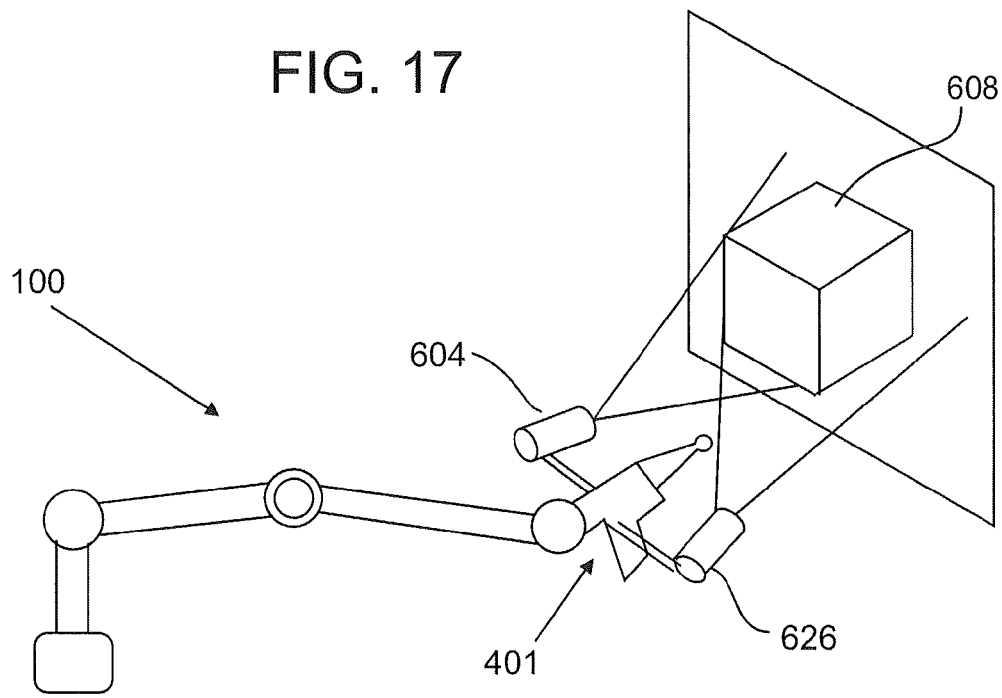
FIG. 17 is a perspective view of another AACMM with two projectors mounted onto a probe end.

Referring to FIGS. 16-17, in accordance with embodiments of another aspect of the present invention, multiple projectors 604, 624, 626 may be used with AACMM 100. An embodiment is the projector 624 points at a wall 628 or work surface. Here the projector 624 may be attached to a movable (e.g. swivel) mount on a fixed (non-moving) portion of the AACMM 100, such as on the base 116 for example. The image 630 from projector 624 may display the same information or different information as from the projector 604 mounted on the probe end 401. The image 630 may be for observation by a second party, or it may serve to replicate the on-board application software display or an ancillary computer display. In this manner, data may be made larger i.e., increased coverage area), or the data may be projected onto a surface 628 that is more easily viewed by the operator during the measurement session.

In addition, multiple projectors 604, 626 mounted on the probe end 401 of AACMM 100 may increase surface area coverage or coverage of 3D profiles, thus accommodating relatively greater movement of the probe end 401 without losing image coverage. The image contours can be adjusted to the contours of the part 608.

Figure 18:
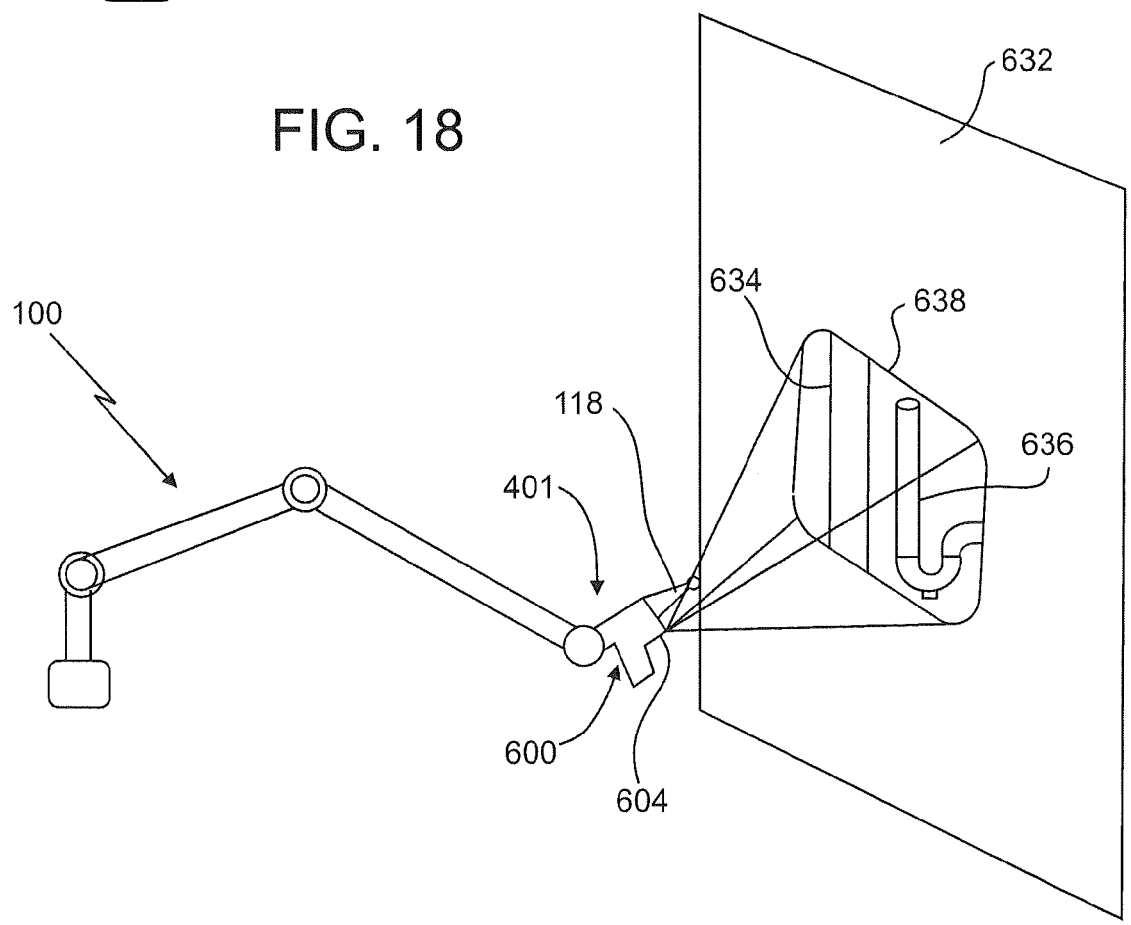
FIG. 18 is a perspective view of an AACMM with a projector mounted onto a probe end, where the projector projects an image onto a surface of a part, where the projected image contains hidden features behind the surface of the part.

Referring to FIG. 18, in accordance with embodiments of another aspect of the present invention, an AACMM 100 with a projector 604 mounted thereon may provide visual task guidance to the operator. Such visual task guidance may be in the form of visualization of features of objects or items that are hidden from view by a surface or other type of obstruction (e.g., a wall or human skin). For example, the projector 604 may project CAD data, CAT scan data, laser scan data, or other data on various surfaces 632 that have one or more objects 634, 636 or items behind the surface 632 that need to be accessed and worked on. However, it is important that the worker identify the precise location of these objects so that no damage is caused to other objects or to reduce that amount of time wasted trying to locate these hidden objects 634, 636. The surface 632 may be a surface of a wall, an assembly, a human body, or other types of surfaces that hide features or objects to be worked on.

FIG. 18 shows the example of an image 638 projected onto a wall surface 632. Behind the wall surface 632 are various items such as studs 634, plumbing pipes 636, and electrical wiring. However, the worker may not know what is positioned behind the wall surface 632 and/or does not know the positioning of these items behind the wall surface 632. It would be advantageous to provide the worker with an image of the items behind the wall surface 632 and the location of 3 those items. Generally, this information about the hidden features is available as, e.g., CAD data.

In another application, the AACMM 100 may be used in an operating room for example. A doctor may use a portable AACMM to determine the location for making an incision or finding a tumor, correlating the position of the probe or measurement device 118 with 3D data from Computer Axial Tomography data. In this case, the projector 604 may project an image on the patient, providing markers or actual replication of CAT scan imagery to guide the surgeon. Surgery performed remotely by manually operated robots may use projection systems in the same way as described above.

In applications where an AACMM is used in a manufacturing environment, the projector 604 may provide guidance for a variety of operations requiring positioning that is driven from 3D CAD or image files. This includes, for example: drilling holes for rivets, instruments, accessories; applying decals or adhesive backed stripes to cars, planes, busses or large parts; painting letters, details or images; grinding/sanding surfaces or welds until they conform to drawing requirements; and locating studs or structural members behind sheathing for nail or screw locations.

Embodiments of this aspect of the present invention provide for visualization of hidden features such as pipes, wiring, ducts, or other objects under walls, bulkheads, floors or behind locked doors helps to determine where cuts can be safely made. These embodiments also provide for projected visualization and guidance for drilling, cutting and access to critical components of explosive ordinance (e.g., when 3D CAD data of the device is available).

According to embodiments of this aspect of the present invention, a projection system for an AACMM projects guidance and part data (e.g., structural CAD data) onto a surface of a part. It also may be used to project images of what is inside walls, structures, or the human body for use in building modification, surgery or other invasive procedures. One or more miniature projectors attached to the arm can project images or data on a part or surface or provide guidance to the operator. The arm/projector combination may provide visualization of features hidden by walls, inside the human body, inside explosive devices, etc. When a 3D record (e.g., CAD drawing, CAT scan, etc.) of the object exists the projector and arm combination can project an image that shows the location of features, as if seeing through the wall.

While the invention has been described with reference to example embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A portable articulated arm coordinate measuring machine (AACMM) for measuring the coordinates of an object in space, comprising:
   a base;
   a manually positionable arm portion having an opposed first end and second end, the arm portion being rotationally coupled to the base, the arm portion including a plurality of connected arm segments, each arm segment including at least one position transducer for producing a position signal;
   a measurement device coupled to the first end;
   an electronic circuit which receives the position signal from the at least one position transducer and provides data corresponding to a position of the measurement device;
   a probe end disposed between the measurement device and the first end, the probe end having a fastener and a first connector, the probe end further having a threaded portion disposed about a portion of the outer surface of a probe end housing and configured to engage the fastener, the fastener being movable between a first position and a second position; and
   a device being configured to couple with the probe end by the fastener when in the second position, the device having a second connector arranged to engage the first connector when the fastener couples the device to the probe end.

2. The AACMM of claim 1 wherein:
   the probe end includes a first actuator and a second actuator coupled to a first controller; and
   the device includes a third actuator and a fourth actuator electrically coupled to a second controller.

3. The AACMM of claim 2 wherein the device includes a handle portion.

4. The AACMM of claim 1 wherein the device includes a feature selected from a group consisting of: bar code scanner, thermal scanner, video camera, light source, image projector, a microphone, an audio recording system and a paint spray nozzle.

5. The AACMM of claim 1 wherein:
   the probe end is rotationally coupled about an axis to the first end; and
   the device is disposed to rotate about the axis.

6. The AACMM of claim 1 wherein:
   first connector includes an electrical connector portion; and
   the second connector includes an electrical connector portion.

7. A portable articulated arm coordinate measuring machine (AACMM) for measuring the coordinates of an object in space, comprising:
   a base;
   a manually positionable arm portion having an opposed first end and second end, the arm portion being rotationally coupled to the base, the arm portion including a plurality of connected arm segments, each arm segment including at least one position transducer for producing a position signal;
   a measurement device coupled to the first end;
   an electronic circuit which receives the position signal from the at least one position transducer and provides data corresponding to a position of the measurement device;
   a probe end disposed between the measurement device and the first end, the probe end having a fastener and a first connector, wherein the probe end includes a first actuator and a second actuator coupled to a first controller;
   a device removably coupled to the probe end by the fastener, the device having a second connector arranged to engage the first connector when the fastener couples the device to the probe end, wherein the device includes a handle portion and a third actuator and a fourth actuator electrically coupled to a second controller;
   wherein the device includes a planar portion disposed at an end of the handle portion and adjacent the fastener, the planar portion being positioned offset from the fastener to define a gap.

8. The AACMM of claim 7 wherein the fastener is a collar coaxially disposed on the probe end.

9. The AACMM of claim 8 wherein the device includes a camera.

10. The AACMM of claim 9 wherein the device includes an optical device disposed adjacent to the camera.

11. A portable articulated arm coordinate measuring machine (AACMM) for measuring the coordinates of an object in space, comprising:
   a manually positionable arm portion having an opposed first end and second end, the arm portion including a plurality of connected arm segments, each arm segment including at least one position transducer for producing a position signal;
   a measurement device coupled to the first end;
   an electronic circuit which receives the position signal from the at least one position transducer and provides data corresponding to a position of the measurement device;
   a housing disposed between the first end and the measurement device;
   a first controller disposed within the housing;
   a first coupler arranged on one side of the housing, the first coupler including fastener movable along a length of the housing between a first position and a second position; and
   a device removably coupled to the housing and having a handle portion, the device having a second coupler on one end and having an angled surface arranged to engage the fastener when in the second position, thereby securing the device to the housing.

12. The AACMM of claim 11 further comprising:
   a first connector adjacent the first coupler and electrically coupled to the first controller;
   a second connector coupled to the device and electrically coupled to the first connector; and
   a second controller disposed within the device and electrically coupled to the first controller via the first connector and the second connector, wherein the second controller is at least partially disposed within the handle portion.

13. The AACMM of claim 12 wherein the device further comprises a first actuator operably coupled to the second controller, the first actuator disposed on the handle portion.

14. The AACMM of claim 13 wherein the device further comprises a second actuator operably coupled to the second controller, the second actuator disposed on the handle portion adjacent the first actuator.

15. The AACMM of claim 11 wherein the device includes a camera disposed on a side adjacent the measurement device, the camera being electrically coupled to the second controller.

16. The AACMM of claim 15 wherein the camera is a video camera.

17. The AACMM of claim 15 wherein the device further includes a laser disposed adjacent the camera, the laser being electrically coupled to the second controller.

18. The AACMM of claim 11 wherein the device includes at least one paint spray nozzle.

19. The AACMM of claim 11 wherein the device includes a bar code scanner.

20. The AACMM of claim 11 wherein the device includes a thermal scanner.

21. The AACMM of claim 11 wherein the device includes an image projector.

22. The AACMM of claim 11 wherein the device includes a light source.

23. A portable articulated arm coordinate measuring machine (AACMM) for measuring the coordinates of an object in space comprising:
   a manually positionable arm portion having an opposed first end and second end, the arm portion including a plurality of connected arm segments, each arm segment including at least one position transducer for producing a position signal;
   a measurement device coupled to the first end;
   an electronic circuit which receives the position signal from the at least one position transducer and provides data corresponding to a position of the measurement device;
   a housing disposed between the first end and the measurement device;
   a first controller disposed within the housing;
   a first coupler arranged on one side of the housing;
   a device removably coupled to the housing and having a handle portion, the device having a second coupler on one end arranged to engage the first coupler, thereby securing the device to the housing, wherein the device further comprises a first actuator operably coupled to the second controller, the first actuator disposed on the handle portion, wherein the device further comprises a second actuator operably coupled to the second controller, the second actuator disposed on the handle portion adjacent the first actuator;
   a first connector adjacent the first coupler and electrically coupled to the first controller;
   a second connector coupled to the device and electrically coupled to the first connector;
   a second controller disposed within the device and electrically coupled to the first controller via the first connector and the second connector, wherein the second controller is at least partially disposed within the handle portion;

wherein the second coupler includes a first projection extending from the device adjacent the second connector, the first projection having an angled first surface on one side; and wherein the first coupler is a fastener movably coupled to the housing adjacent the first connector opposite the first projection, wherein the fastener is movable between a first position and a second position to engage the first surface.

24. The AACMM of claim 23 wherein the second coupler further includes a second projection extending adjacent the second connector, the second projection having a lip portion sized to be received in a slot.

25. The AACMM of claim 24 wherein the device includes:
a second surface disposed between the first projection and the second projection; and
a third surface adjacent to and offset a predetermined distance from the second surface and arranged to define a gap between the third surface and the fastener.

26. The AACMM of claim 25 wherein the housing includes a first thread portion and the fastener includes a second thread portion, wherein the fastener is moved from the first position to the second position when the second thread portion is rotated relative to the first thread portion.

27. A method of operating a portable articulated arm coordinate measuring machine for measuring the coordinates of an object in space, comprising:
providing a manually positionable arm portion having an opposed first end and second end, the arm portion including a plurality of connected arm segments, each arm segment including at least one position transducer for producing a position signal;
providing a probe end for measuring the object, the probe end having a first controller, the probe end having a first electrical connector electrically coupled to the first controller and a fastener, the fastener being coaxially disposed on the probe end and movable between a first position and a second position along a length of the probe end, the probe end being coupled to the first end;
providing a measurement device operably coupled to probe end;
receiving at an electronic circuit the position signals from the transducers;
determining data corresponding to a position of the measurement device with the electronic circuit;
providing a device having a second controller, the device having a second electrical connector electrically coupled to the second controller and a coupler, the coupler having an angled surface;
moving the fastener from the first position to the second position;
engaging the angled surface with the fastener as the fastener moves from the first position to the second position;
mechanically coupling the device to the probe end with the coupler and the fastener when the fastener is in the second position;
electrically coupling the first electrical connector to the second electrical connector; and
transmitting a first signal from the second controller to the first controller.

28. The method of claim 27 further comprising:
performing a first function with the first controller when the device is coupled to the probe end; and
performing a second function with the first controller in response to the first signal.

29. The method of claim 28 further comprising transmitting a second signal from the first controller to the second controller.

30. The method of claim 29 further comprising:
providing a base coupled to the second end; and
providing a third controller disposed in the base, the third controller being in bidirectional communication with the first controller and the second controller.

31. The method of claim 30 further comprising transmitting a third signal from the second controller to the third controller.

32. The method of claim 31 wherein the third signal is selected from a group consisting of: an image signal; a video image signal, a laser line probe signal, a temperature signal, and a bar code signal.

33. The method of claim 30 further comprising transmitting a fourth signal from the third controller to the second controller.

34. The method of claim 33 wherein the fourth signal is selected from a group consisting of: light source signal, a projected image signal, and a paint color.

35. The method of claim 34 wherein the fourth signal is transmitted via a wireless communications connection.

36. The method of claim 30 wherein the third controller communicates with the second controller includes a wireless communications connection.

37. A portable articulated arm coordinate measuring machine (AACMM) for measuring the coordinates of an object in space, comprising:
a base;
a manually positionable arm portion having an opposed first end and second end, the arm portion being rotationally coupled to the base, the arm portion including a plurality of connected arm segments, each arm segment including at least one position transducer for producing a position signal;
a probe end coupled to the first end;
an electronic circuit which receives the position signal from the at least one position transducer and provides data corresponding to a position of the probe end; and
a first projector is removably coupled to the probe end, the first projector being operable to project a first information onto a first projection surface, the projected first information being indicative of a presence and location of one or more features associated with the first projection surface.

38. The AACMM of claim 37 wherein the one or more features includes an object located out of a line of sight behind the projection surface, the projected information being determined at least in part by the determined position of the probe end.

39. The AACMM of claim 38 further comprising a second projector mounted to the AACMM adjacent the probe end, the second projector being operable to project a second information onto the first projection surface.

40. The AACMM of claim 38 further comprising a third projector operably coupled to the AACMM, the third projector being operable to project a third information onto a second projection surface.

41. The AACMM of claim 40 wherein the third information is the same as the first information.

42. The AACMM of claim 37 wherein the projection of the first information includes an indicator highlighting a feature on the first projection surface.

43. The AACMM of claim 42 wherein the projection of the first information includes textual instructions.

44. The AACMM of claim 42 wherein the projection of the first information includes a textual indicator of a measurement.

45. The AACMM of claim 42 wherein the projection of the first information includes an indicator of a tolerance.

46. The AACMM of claim 42 wherein the projection of the first information includes a measurement indicator.

47. A removable accessory for portable articulated arm coordinate measuring machine (AACMM) for measuring the coordinates of an object in space, the AACMM having a probe end coupled to a first end of the AACMM, the probe end having a first mechanical coupler having a fastener and a first electrical connector, the removable accessory comprising:
 a second mechanical coupler configured to be removably coupled to the first mechanical coupler, the second mechanical coupler including first projection on a second end, a second projection on an opposite third end and a pivot point positioned therebetween, the second projection being configured to engage the fastener;
 a handle portion operably coupled to the second mechanical coupler.

48. The removable accessory for an AACMM of claim 47 further comprising a second electrical connector adjacent the pivot point, the second electrical connector being removably connected to the first electrical connector.

49. The removable accessory for an AACMM of claim 48 further comprising a controller electrically coupled to the second electrical connector.

50. The removable accessory for an AACMM of claim 49 further comprising a sensor electrically coupled to the controller.

51. The removable accessory for an AACMM of claim 50 wherein the sensor is a camera.

52. The removable accessory for an AACMM of claim 51 further comprising an optical device disposed adjacent to the camera.

53. The removable accessory for an AACMM of claim 50 wherein the sensor is selected from a group consisting of: bar code scanner, thermal scanner, video camera, light source, image projector, a microphone, and an audio recording system.

54. The removable accessory for an AACMM of claim 49 further comprising a paint spray nozzle operably coupled to the controller.

* * * * *